Nov. 7, 1950     T. A. CAROTHERS ET AL     2,528,740
TAGGING AND LISTING MACHINE

Filed Dec. 7, 1945     23 Sheets-Sheet 1

INVENTORS
THOMAS A. CAROTHERS
CLARENCE B. DESJARDINS
EDWARD J. UTZ
BY *Clarence B. Desjardins*
THEIR ATTORNEY Nov. 7, 1950 T. A. CAROTHERS ET AL 2,528,740
TAGGING AND LISTING MACHINE
Filed Dec. 7, 1945 23 Sheets-Sheet 2

INVENTORS
THOMAS A. CAROTHERS
CLARENCE B. DES JARDINS
EDWARD J. UTZ
BY Clarence B. DesJardins
THEIR ATTORNEY

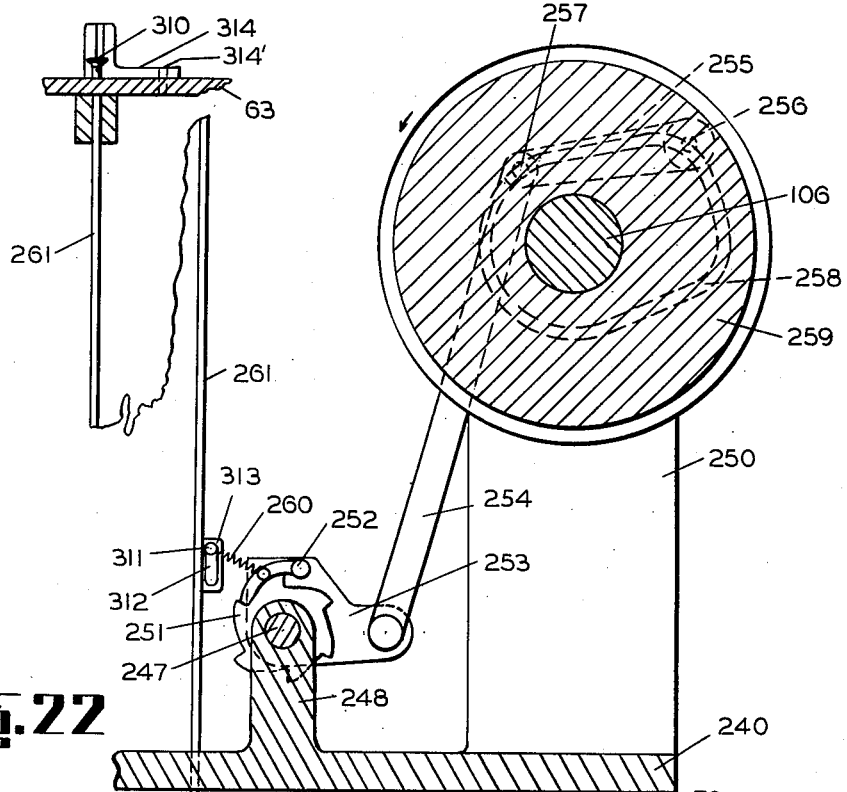
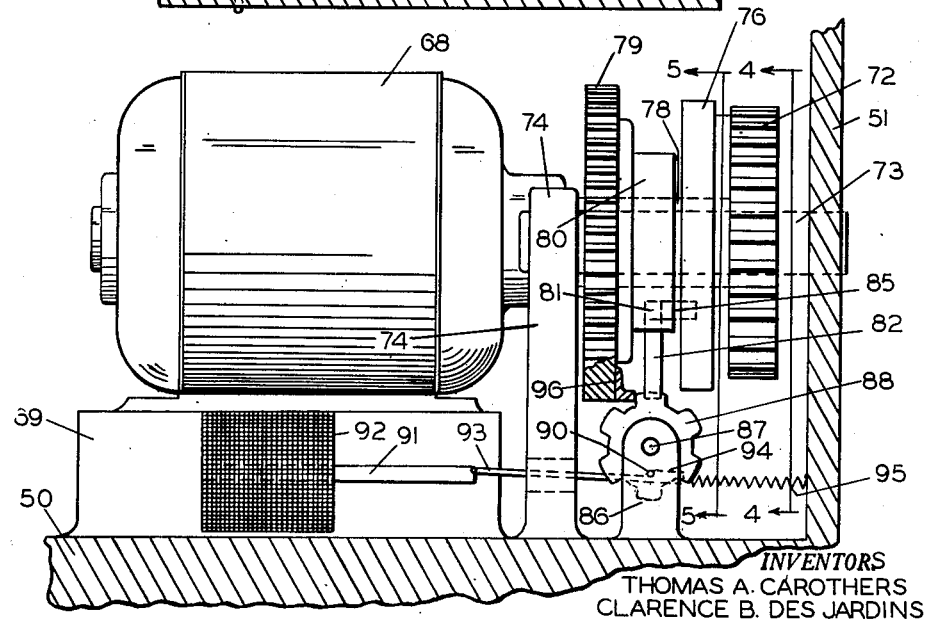

Nov. 7, 1950  T. A. CAROTHERS ET AL  2,528,740
TAGGING AND LISTING MACHINE

Filed Dec. 7, 1945  23 Sheets-Sheet 4

INVENTORS
THOMAS A. CAROTHERS
CLARENCE B. DES JARDINS
EDWARD J. UTZ
BY Clarence B. DesJardins
THEIR ATTORNEY

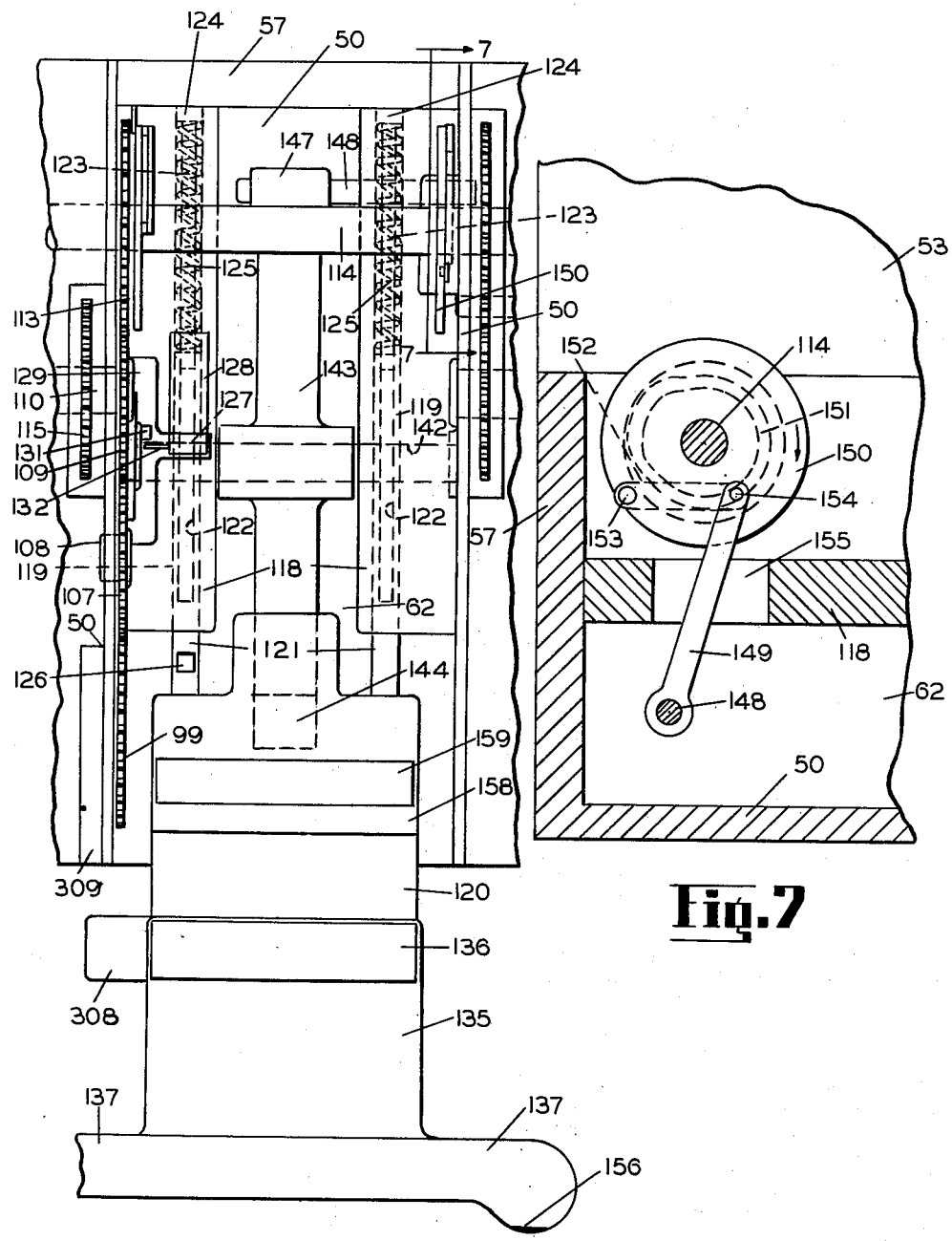

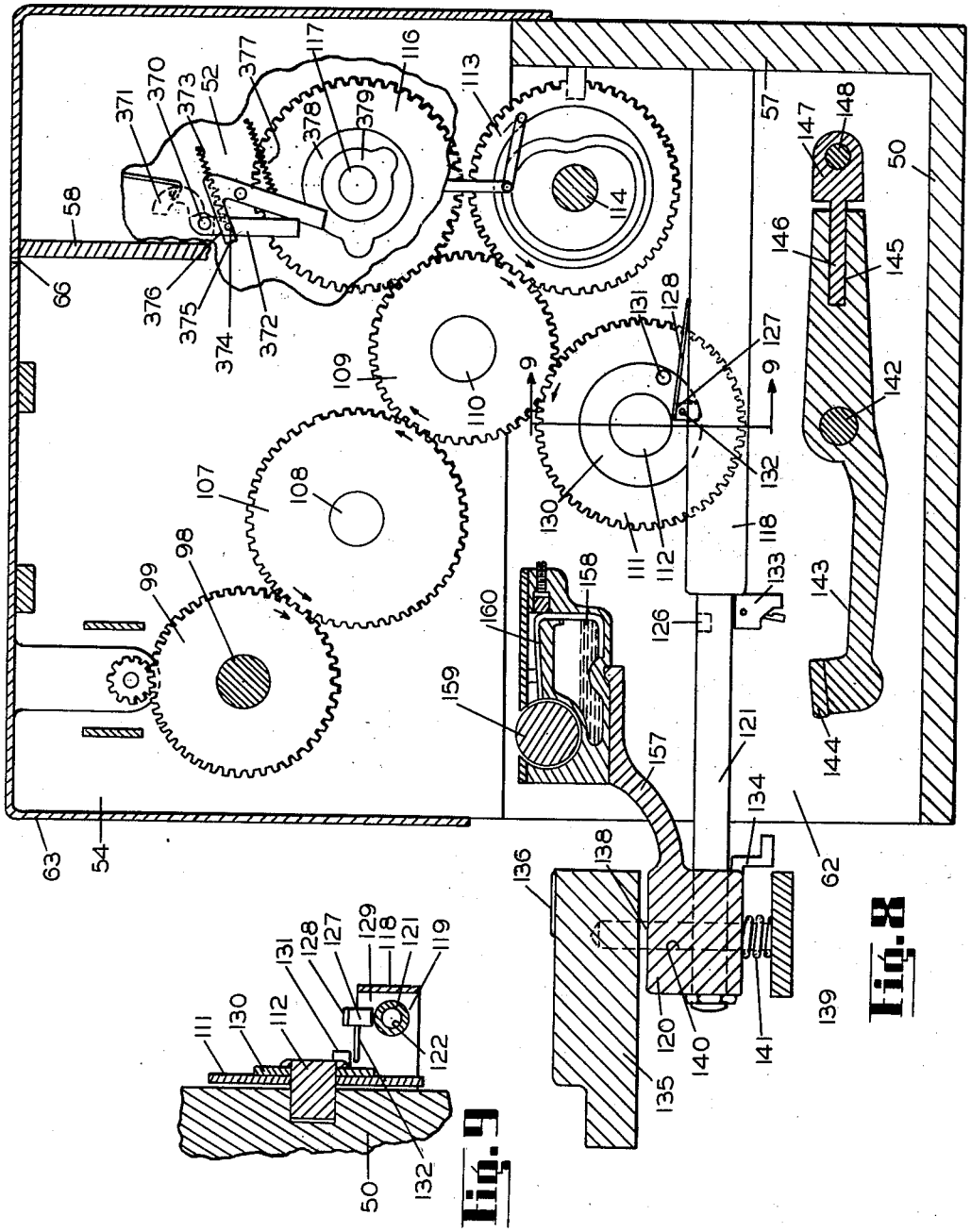

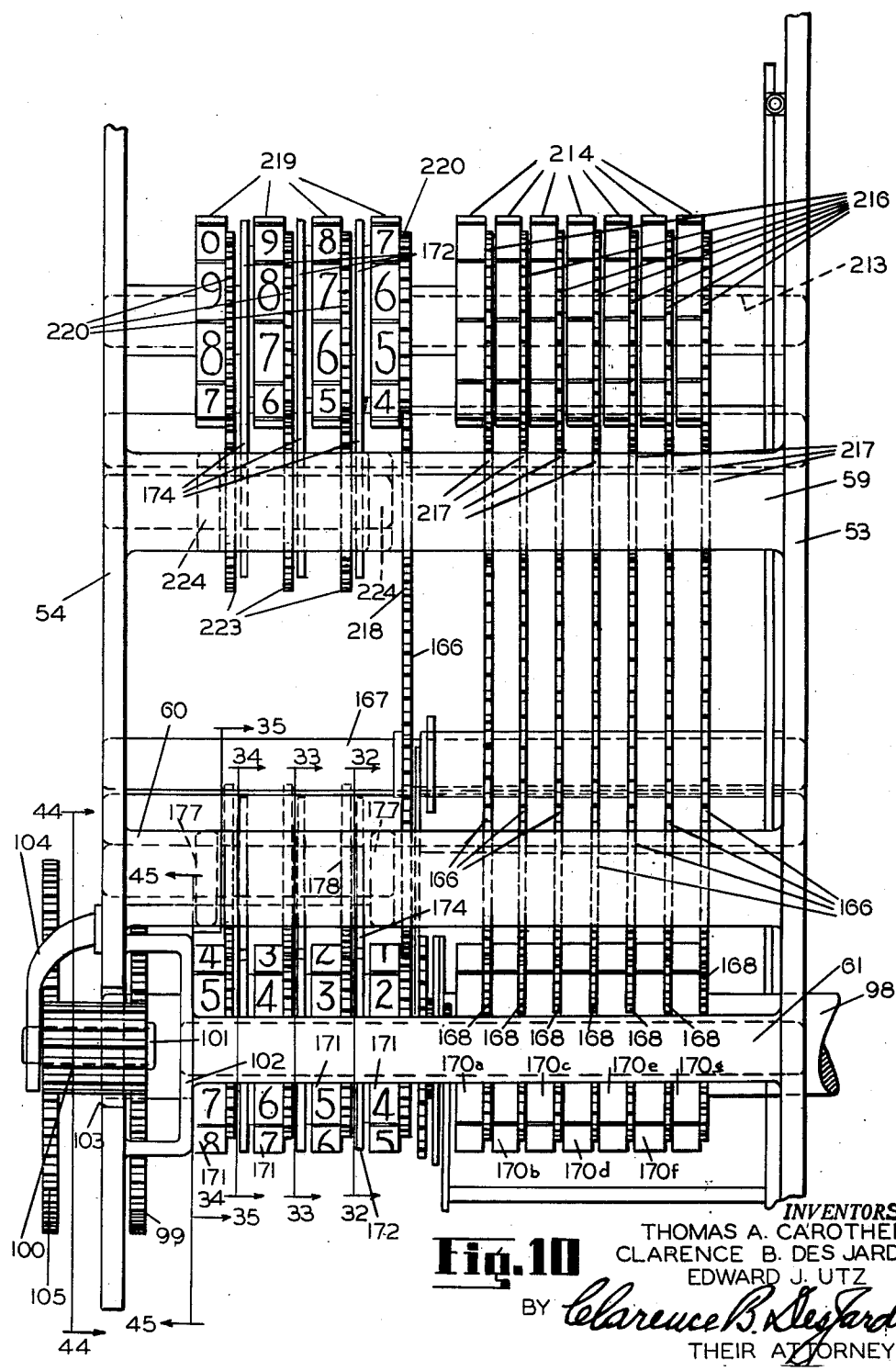

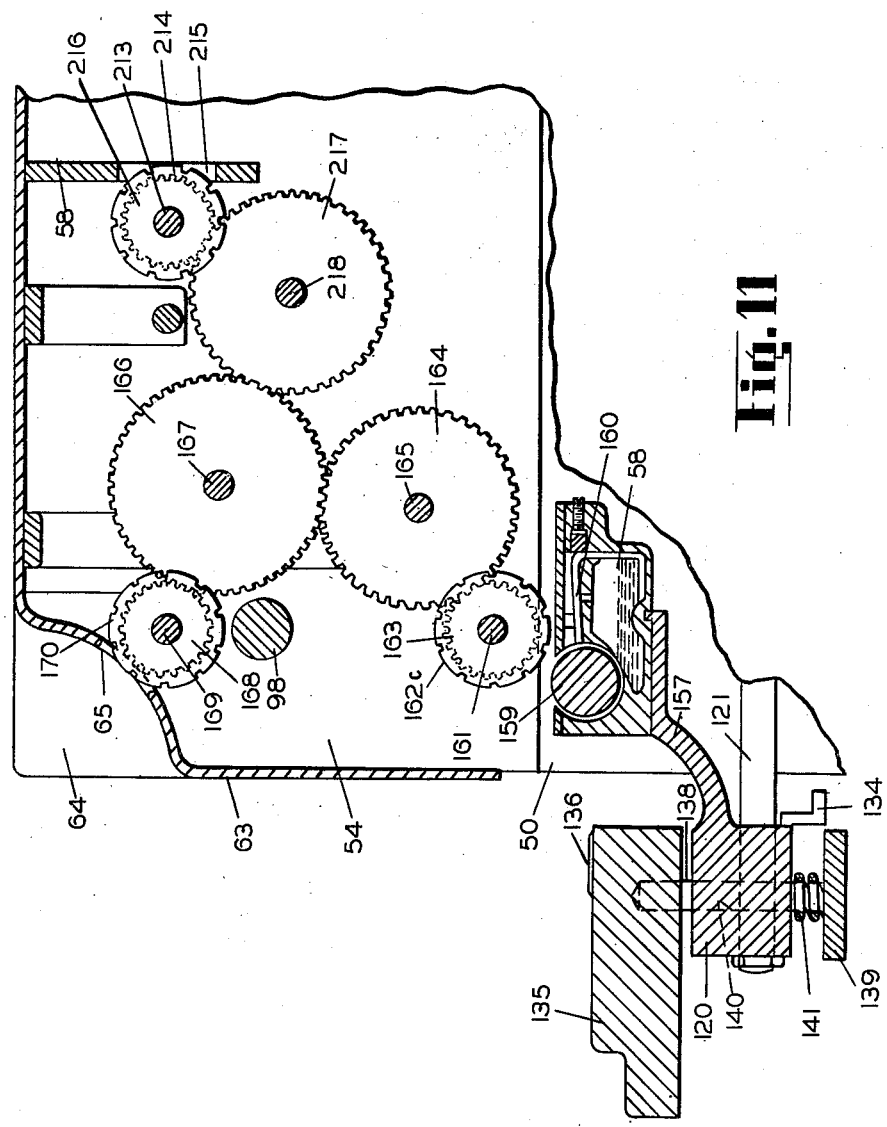

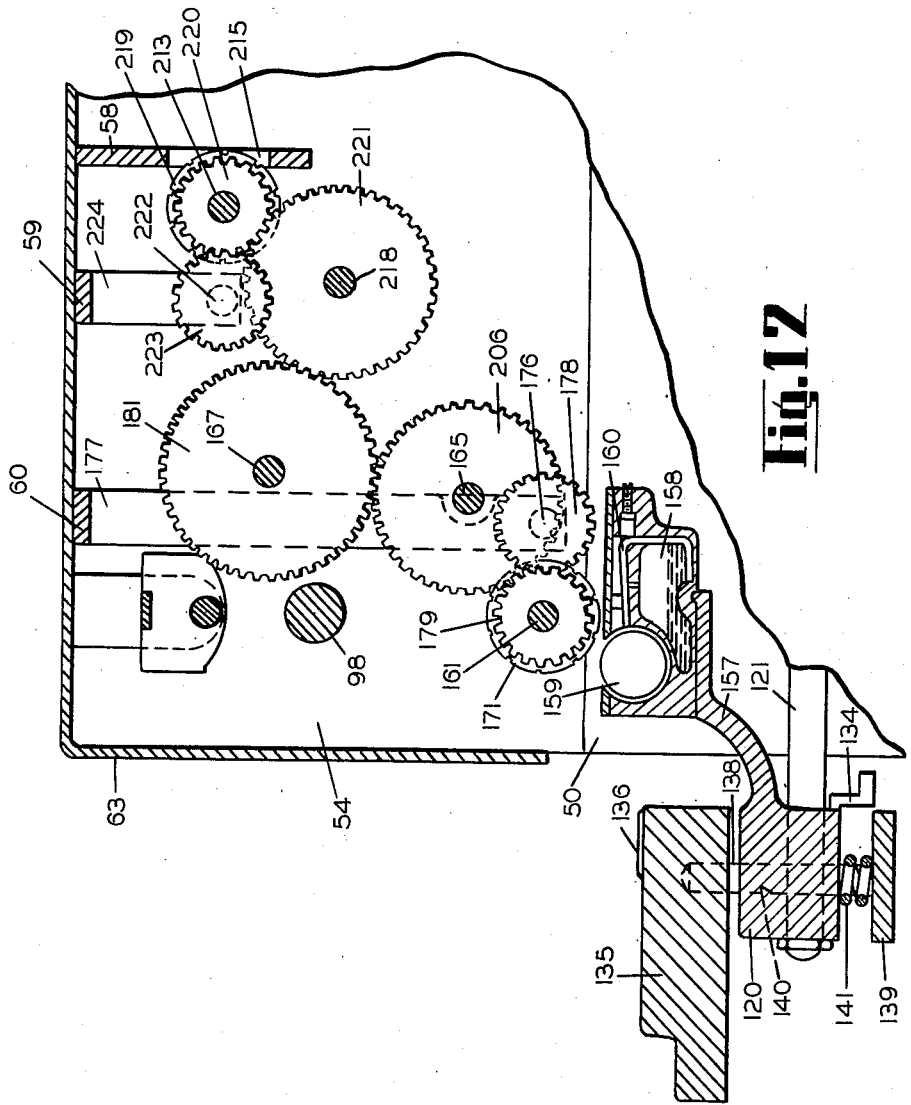

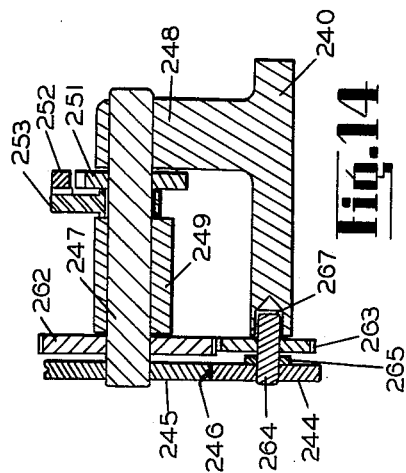
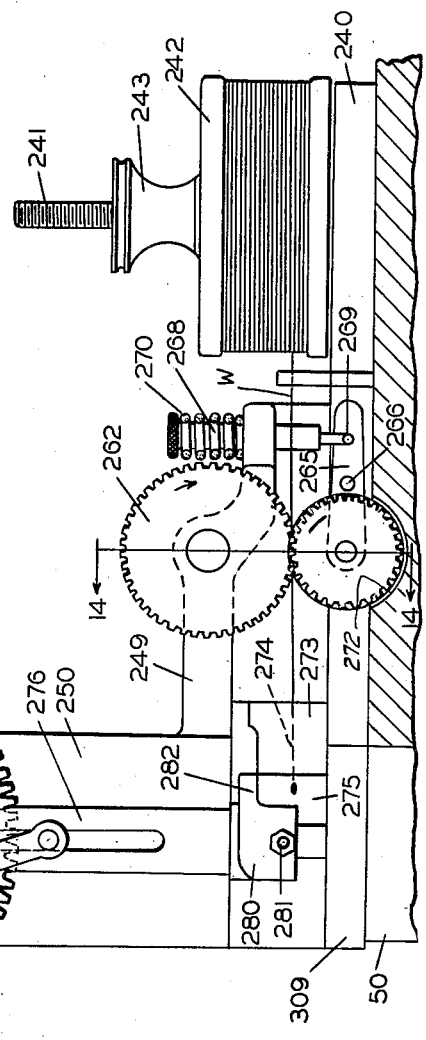

Nov. 7, 1950
T. A. CAROTHERS ET AL
2,528,740
TAGGING AND LISTING MACHINE
Filed Dec. 7, 1945
23 Sheets-Sheet 11
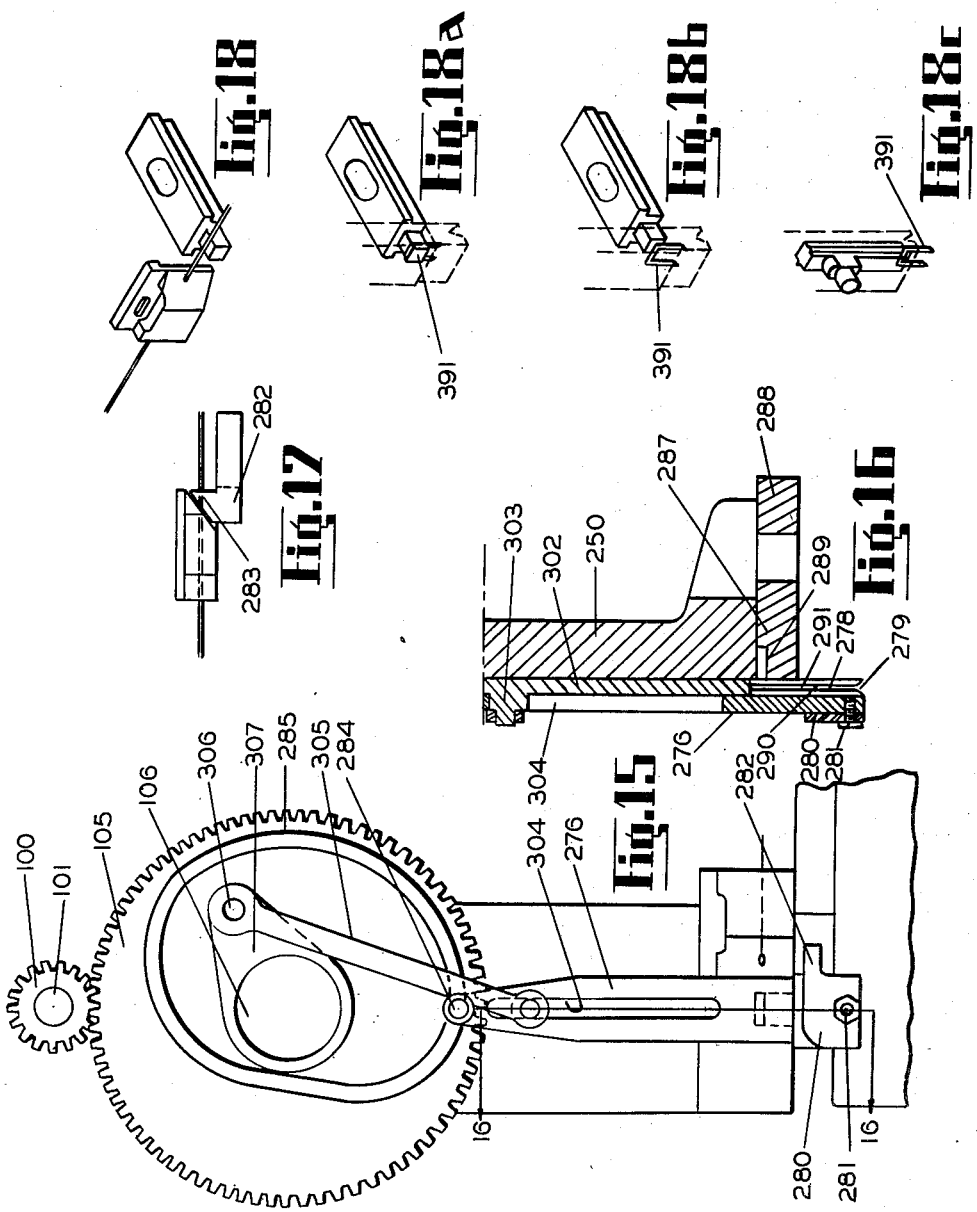
INVENTORS
THOMAS A. CAROTHERS
CLARENCE B. DES JARDINS
EDWARD J. UTZ
BY Clarence B. Desjardins
THEIR ATTORNEY.

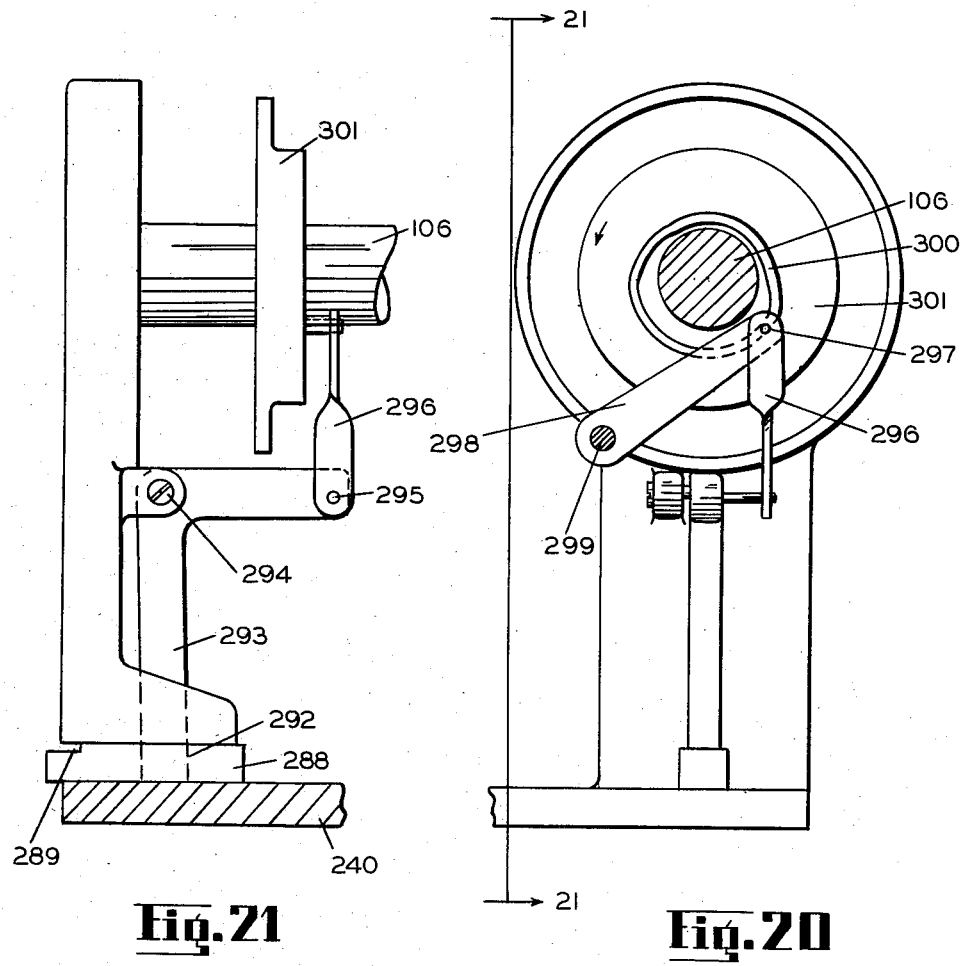

Nov. 7, 1950 T. A. CAROTHERS ET AL 2,528,740
TAGGING AND LISTING MACHINE
Filed Dec. 7, 1945 23 Sheets-Sheet 14

INVENTORS
THOMAS A. CAROTHERS
CLARENCE B. DES JARDINS
EDWARD J. UTZ
BY Clarence B Desjardins
THEIR ATTORNEY

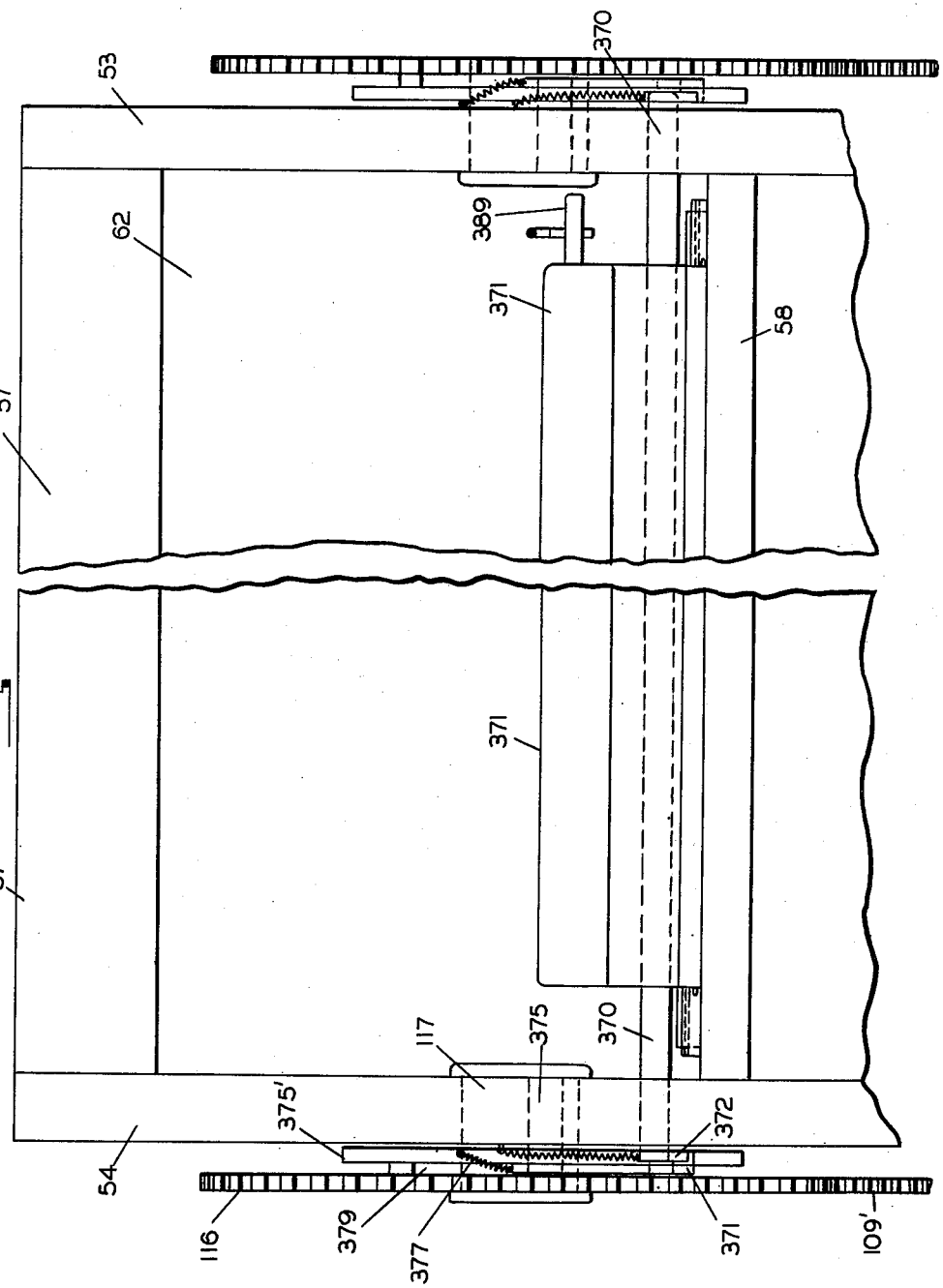

Nov. 7, 1950  T. A. CAROTHERS ET AL  2,528,740
TAGGING AND LISTING MACHINE

Filed Dec. 7, 1945  23 Sheets-Sheet 17

INVENTORS
THOMAS A. CAROTHERS
CLARENCE B. DESJARDINS
EDWARD J. UTZ
BY Clarence B. Desjardins
THEIR ATTORNEY Nov. 7, 1950     T. A. CAROTHERS ET AL     2,528,740
TAGGING AND LISTING MACHINE Filed Dec. 7, 1945     23 Sheets-Sheet 18

INVENTORS
THOMAS A. CAROTHERS
CLARENCE B. DES JARDINS
EDWARD J. UTZ
BY Clarence B. Desjardins
THEIR ATTORNEY Nov. 7, 1950  T. A. CAROTHERS ET AL  2,528,740
TAGGING AND LISTING MACHINE
Filed Dec. 7, 1945  23 Sheets-Sheet 19

INVENTORS
THOMAS A. CAROTHERS
CLARENCE B. DES JARDINS
EDWARD J. UTZ
BY Clarence B. Desjardins
THEIR ATTORNEY Nov. 7, 1950  T. A. CAROTHERS ET AL  2,528,740
TAGGING AND LISTING MACHINE
Filed Dec. 7, 1945  23 Sheets-Sheet 20
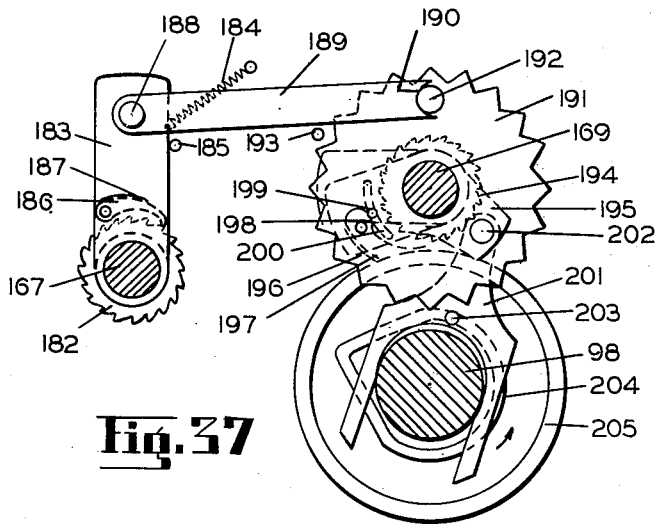
Fig. 37
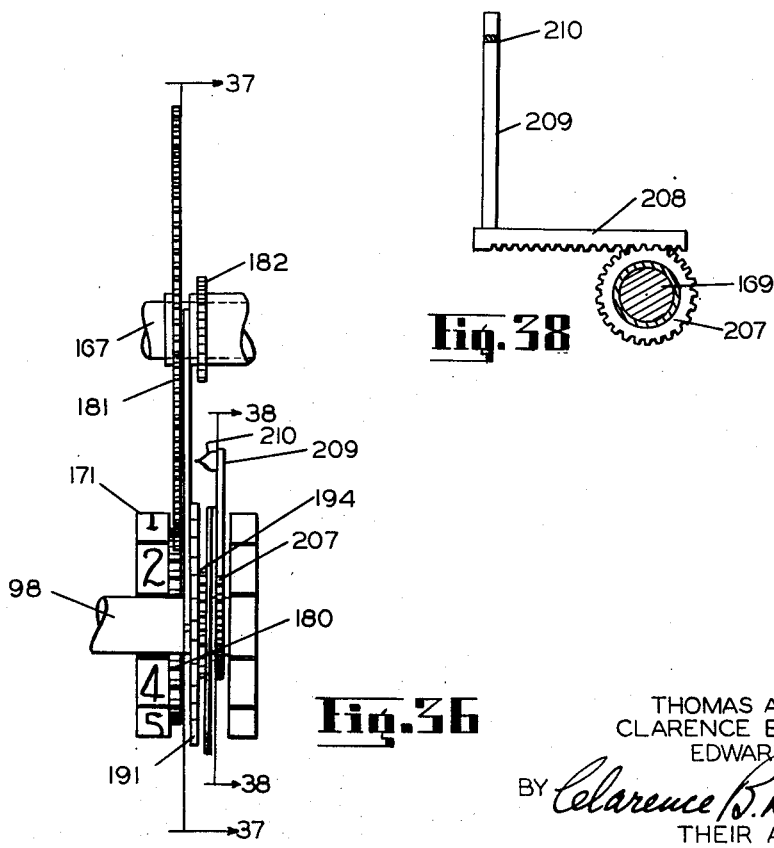
Fig. 38
Fig. 36
INVENTORS
THOMAS A. CAROTHERS
CLARENCE B. DES JARDINS
EDWARD J. UTZ
BY Clarence B. DesJardins
THEIR ATTORNEY

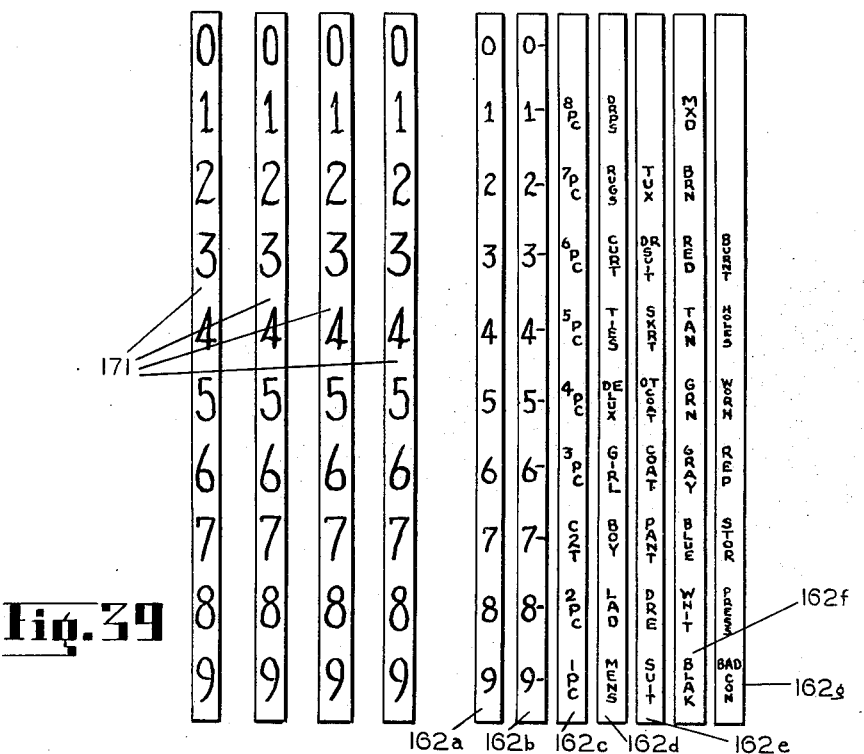

Nov. 7, 1950     T. A. CAROTHERS ET AL     2,528,740
TAGGING AND LISTING MACHINE

Filed Dec. 7, 1945                      23 Sheets-Sheet 22

*INVENTORS*
THOMAS A. CAROTHERS
CLARENCE B. DES JARDINS
EDWARD J. UTZ
BY *Clarence B. Desjardins*
THEIR ATTORNEY Nov. 7, 1950     T. A. CAROTHERS ET AL     2,528,740
TAGGING AND LISTING MACHINE Filed Dec. 7, 1945     23 Sheets-Sheet 23

INVENTORS
THOMAS A. CAROTHERS
CLARENCE B. DES JARDINS
EDWARD J. UTZ
BY *Clarence B. DesJardins*
THEIR ATTORNEY Patented Nov. 7, 1950

2,528,740

UNITED STATES PATENT OFFICE 2,528,740

TAGGING AND LISTING MACHINE

Thomas A. Carothers, Clarence B. Des Jardins, and Edward J. Utz, Cincinnati, Ohio, assignors to The National Marking Machine Company, Cincinnati, Ohio, a corporation of Ohio Application December 7, 1945, Serial No. 633,440

33 Claims. (Cl. 101—95)

Our invention relates to a combined tagging and listing machine and has to do, more particularly, with a machine for cutting a tag or label, printing suitable identification marks thereon, attaching the tag to a garment or the like to be subjected to dry cleaning, and simultaneously printing a list of the marks printed on the several tags.

The machine embodying our invention is intended for use in dry cleaning establishments, in which it is the present practice, upon receiving from a customer a bundle of garments to be dry cleaned, to write out, manually, upon separate tags or labels, one for each of the articles in the bundle, an order number, a route number and descriptive identification data regarding the items to be dry cleaned. One of these tags or labels is attached to each of the articles of the bundle, for the purpose of identifying it in the dry cleaning process. It is desirable that the order numbers should run consecutively, and that the order numbers should be identical for each article of a particular group, for example, each piece of a three-piece suit should have the same order number. It is also desirable to make a list automatically of the order numbers and identification marks on the tags applied to the various pieces.

The principal object of our invention is to provide a machine which will automatically form a tag, print thereon identification data and a consecutive order number, attach this tag to the garment, and also print on a list the same identification data and order number.

Another object of our invention is to provide a machine having means whereby a single setting of the type, for printing the identification data and the consecutive number on the tag, will also set the type for printing the same identification data and consecutive number on a list.

A further object of our invention is to provide type-carriers for printing on the tag and the list, which are controlled from two sources, one an automatic device for setting type to print the next consecutive number, and the other a manual setting means.

Another object of our invention is to provide a machine having a consecutive number device, and means for controlling this device to repeat the printing of the same consecutive number a predetermined number of times, depending upon the number of pieces in the group of garments to be tagged. A further object of our invention is to provide a machine having means for indicating the number of articles in a particular group to be tagged and means controlled thereby for advancing automatically the consecutive number device, to print the next consecutive number, during the cycle of operation in which the last tag of the group is printed.

Another object of our invention is to provide a machine having a listing mechanism and impression devices for printing on a list, and automatic means for disabling said impression devices for all but the last of a series of tag-printing operations in which the same order number is printed.

A further object of our invention is to provide a machine having a stapling mechanism for attaching the tag to the garment, and means for disabling said stapling mechanism so that tags may be formed and printed, and items listed, without attaching the tags to garments.

Another object of our invention is to provide a machine in which the garment, to which the tag is to be attached, is supported upon a platen movable from normal to a printing position, and in which the movement of this platen from normal to printing position controls the operation of means for feeding a tape, means for severing the tape to form a tag, means for stapling the tag to a garment, means for printing on the tag and for listing, and means for automatically advancing a consecutive number mechanism.

Another object of our invention is to provide a machine in which the garment, to which the tag is to be attached, is supported upon a platen movable from normal to printing position, and in which the hands of the operator, when in position holding the garment upon the platen, control means, operative when the platen is moved frome normal to printing position, for feeding a tape, for severing the tape to form a tag, for stapling the tag to the garment, for printing on the tag and listing, and for automatically advancing a consecutive number mechanism.

Further objects, and objects relating to details of construction and economies of operation, will definitely appear from the detailed description to follow. In one instance, we have accomplished the objects of our invention by the devices and means described in the following specification. Our invention is clearly defined and pointed out in the appended claims. A structure constituting a preferred embodiment of our invention is illustrated in the accompanying drawings, forming a part of this specification, in which:

Fig. 3 is a vertical, sectional view, taken on the line 3—3 of Fig. 2, showing the driving motor and the clutch mechanism in front elevation.

Fig. 6 is a top plan view of the platen, the mounting thereof and platen-operating mechanism.

Fig. 7 is a detail, sectional view, taken on the line 7—7 of Fig. 6, showing the cam for operating the lifter lever.

Fig. 8 is a vertical, sectional view, taken longitudinally of the machine on the line 8—8 of Fig. 1.

Fig. 9 is a detail, sectional view, taken on the line 9—9 of Fig. 8.

Fig. 10 is a top plan view, on an enlarged scale, showing the indicating and setting wheels, the type wheels of the consecutive number device for the tag-printing mechanism, the type wheels for the listing mechanism and the interconnecting gearing.

Fig. 11 is a vertical, sectional view, taken longitudinally of the machine on the line 11—11 of Fig. 2.

Fig. 12 is a vertical, sectional view of the machine, taken on the line 12—12 of Fig. 2.

Fig. 13 is a detail, sectional view, taken on the line 13—13 of Fig. 2, showing the stapling mechanism.

Fig. 14 is a detail, sectional view, taken on the line 14—14 of Fig. 13.

Fig. 15 is a view similar to a part of Fig. 13, but showing the positions of the parts after cutting the wire for the staple and forming the staple, but prior to driving it.

Fig. 16 is a detail, sectional view, taken on the line 16—16 of Fig. 15.

Fig. 17 is a fragmentary, bottom plan view of the means for cutting off a length of wire, from which a staple is to be formed.

Figs. 18 to 18c, inclusive, are perspective views of the staple-forming and driving mechanism at various stages in the operation thereof.

Figure 19:
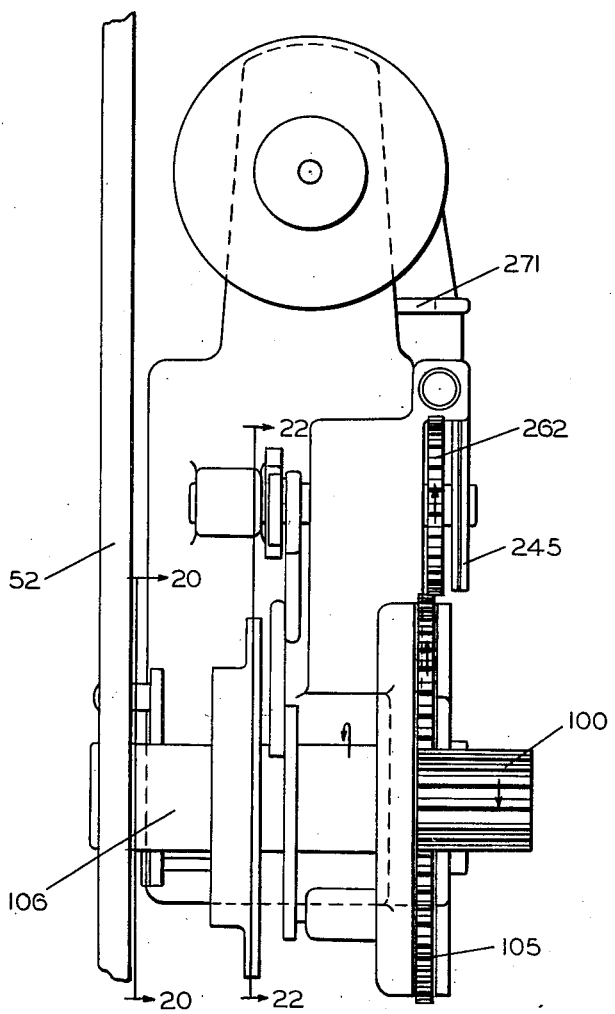

Fig. 19 is a fragmentary, top plan view of the stapling mechanism.

Fig. 20 is a detail, sectional view, taken on the line 20—20 of Fig. 19, showing the anvil shifting devices.

Fig. 21 is a vertical sectional view, taken on the line 21—21 of Fig. 20.

Fig. 22 is a vertical, sectional view of the stapling mechanism, taken on the line 22—22 of Fig. 19.

Figure 2:
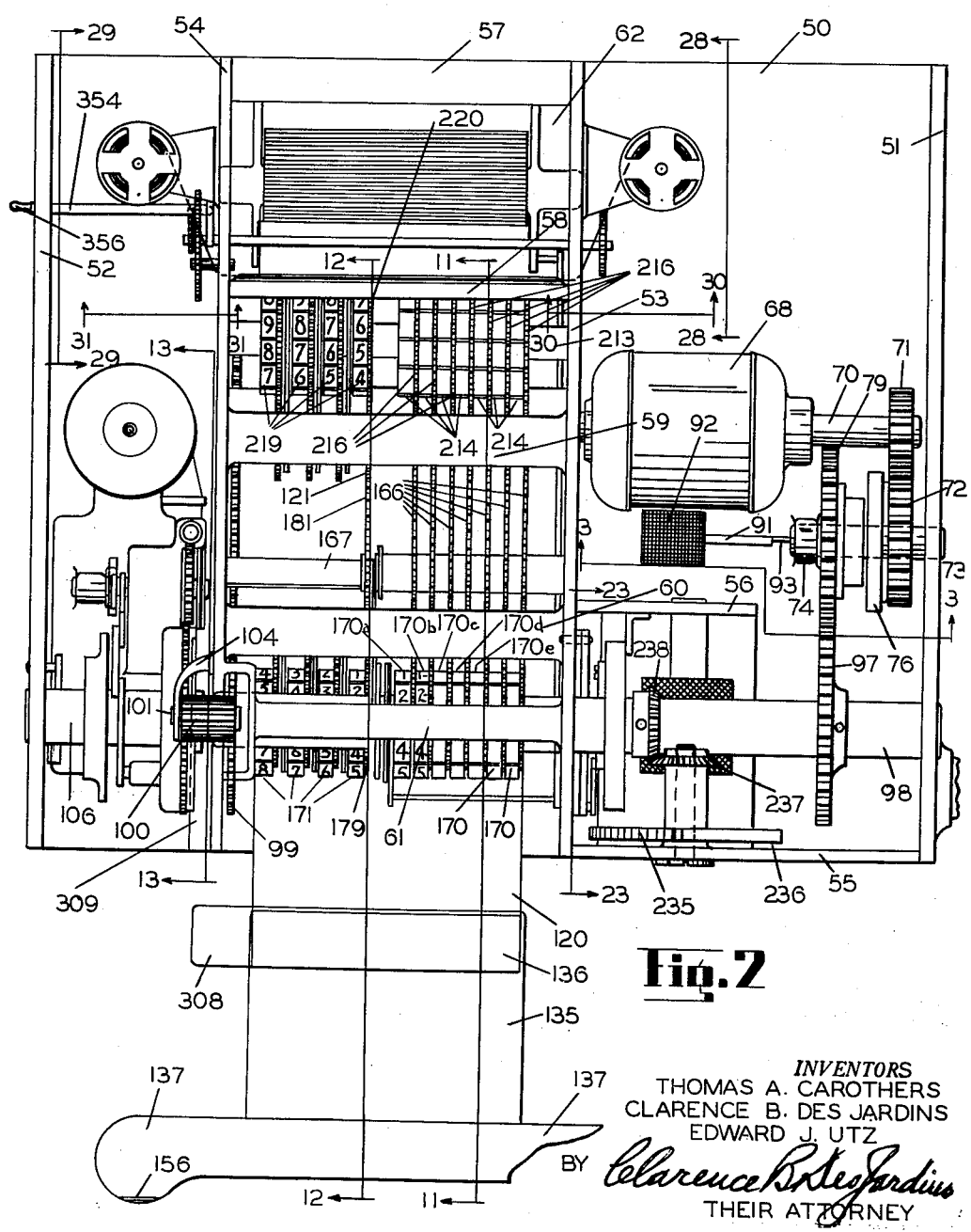
Fig. 2 is a top plan view of the machine with the casing removed.
Figure 23:
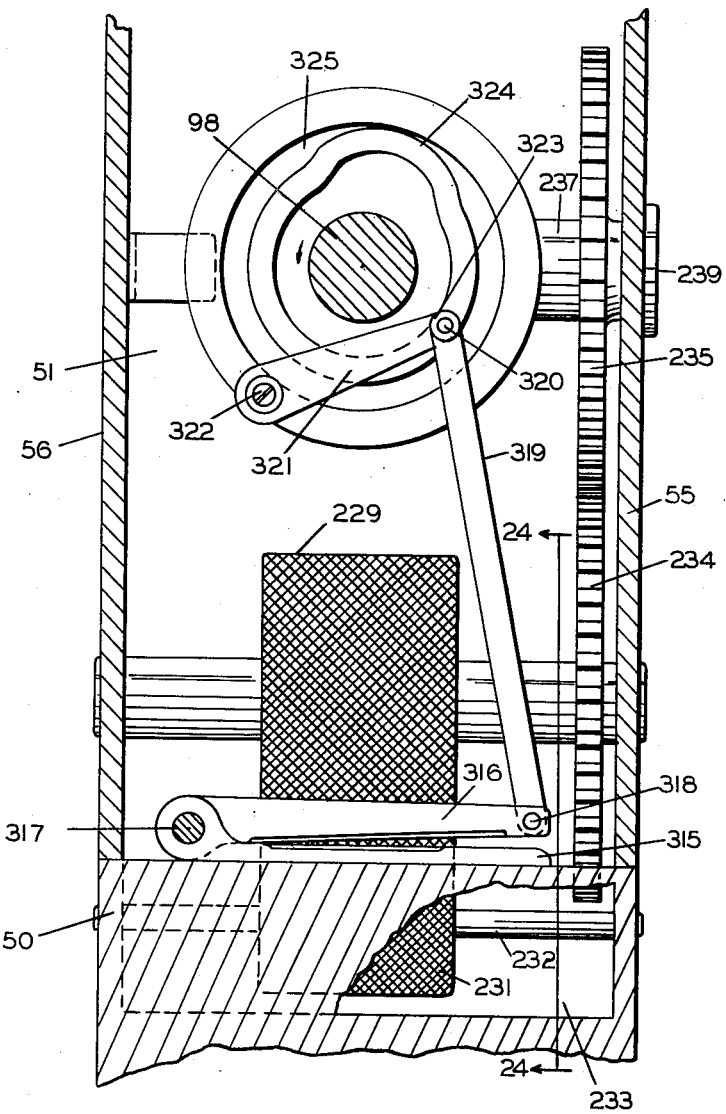

Fig. 23 is a vertical, sectional view, taken on the line 23—23 of Fig. 2, showing the tape-severing mechanism.

Figure 24:
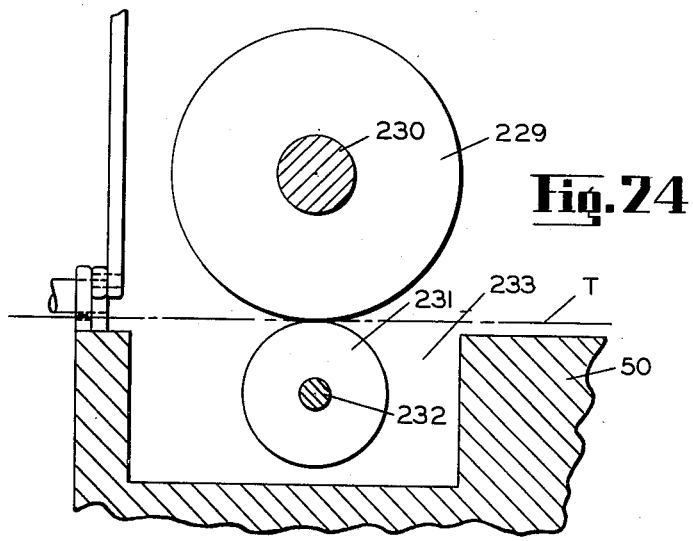

Fig. 24 is a vertical, sectional view, taken on the line 24—24 of Fig. 23.

Figure 25:
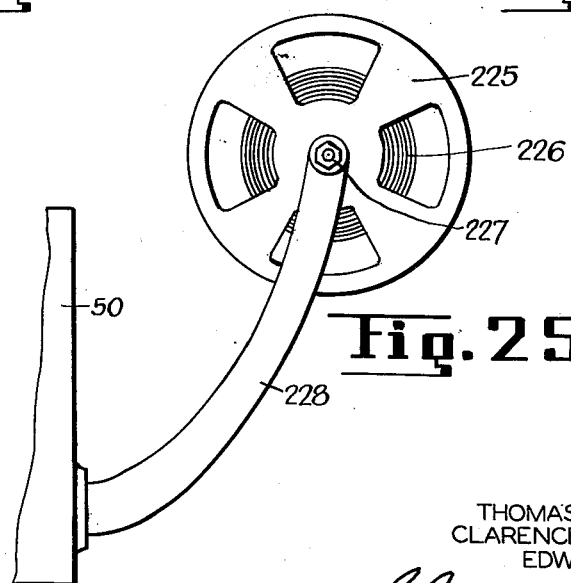

Fig. 25 is a fragmentary view in side elevation of the tape reel.

Figure 26:
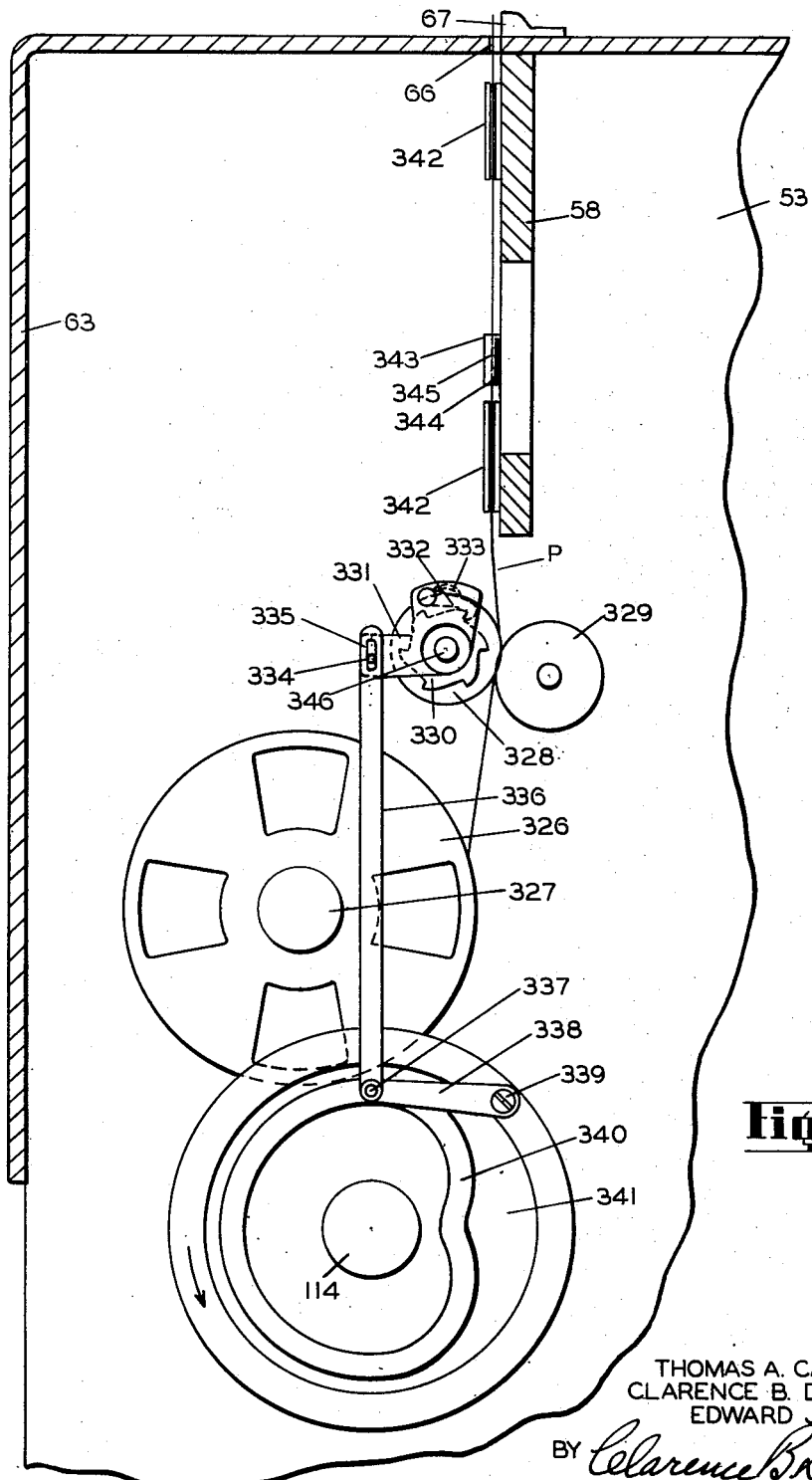

Fig. 26 is a view in side elevation of the reel for holding the record strip for the listing mechanism, and the devices for advancing said record strip.

Fig. 27 is a top plan view, on an enlarged scale, of the listing mechanism showing the printing hammer and the actuating devices therefor.

Figure 28:
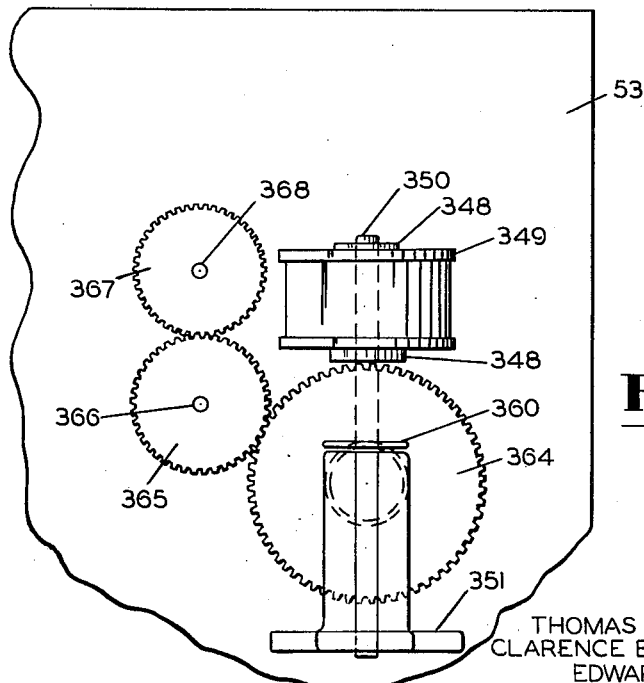

Fig. 28 is a fragmentary view taken on the line 28—28 of Fig. 2, showing the ribbon feed devices for the listing mechanism in side elevation.

Figure 29:
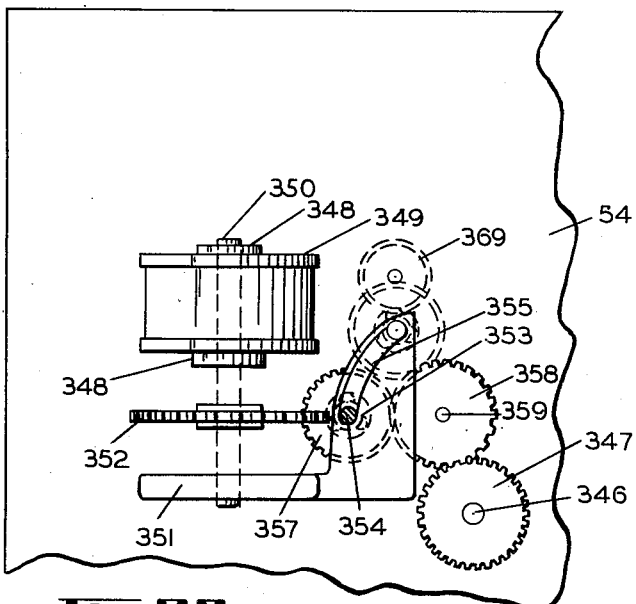

Fig. 29 is a fragmentary view taken on the line 29—29 of Fig. 2, showing the ribbon feed devices for the listing mechanism, on the other side of the machine from those shown in Fig. 28.

Figure 30:
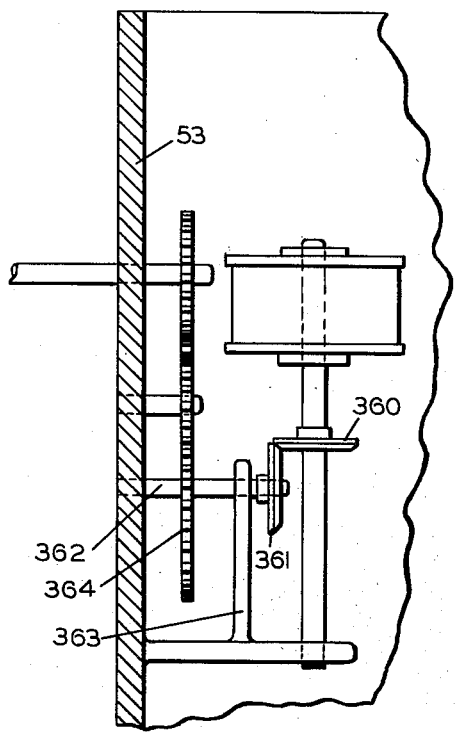

Fig. 30 is a fragmentary view, taken on the line 30—30 of Fig. 2, and showing the ribbon feed devices at one side of the machine.

Figure 31:
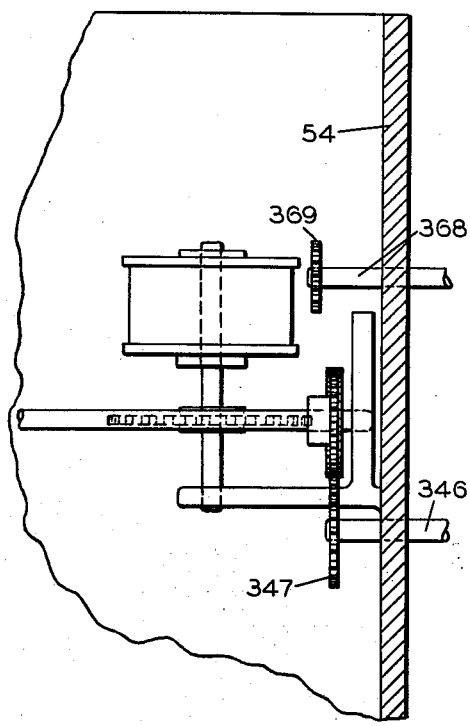

Fig. 31 is a fragmentary view, taken on the line 31—31 of Fig. 2, and showing the ribbon feed devices at the other side of the machine.

Figure 32:
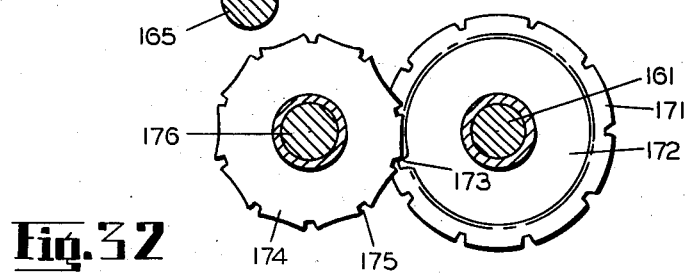

Fig. 32 is a detail, sectional view, taken on the line 32—32 of Fig. 10, and showing the devices for causing a tens-transfer from the units to the tens order of the consecutive number device.

Figure 33:
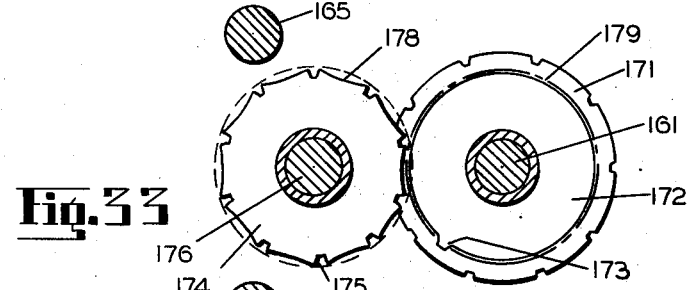

Fig. 33 is a detail, sectional view, taken on the line 33—33 of Fig. 10, and showing the devices for causing a tens-transfer from the tens to the hundreds order of the consecutive number device.

Figure 34:
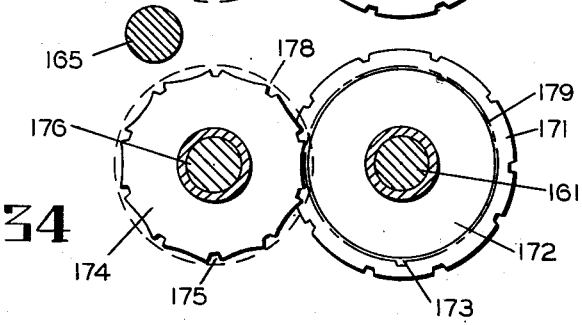

Fig. 34 is a detail, sectional view, taken on the line 34—34 of Fig. 10, and showing the devices for causing a tens-transfer from the hundreds to the thousands order of the consecutive number device.

Figure 35:
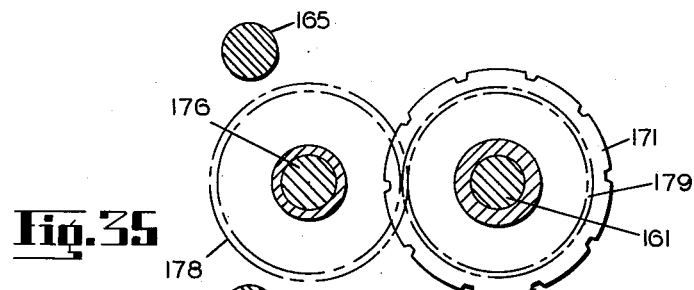

Fig. 35 is a detail, sectional view, taken on the line 35—35 of Fig. 10, and showing the thousands order type wheel of the consecutive number device.

Fig. 36 is a top plan view of the automatic means for advancing the consecutive number device and the manually settable means for controlling it.

Fig. 37 is a detail, sectional view, taken on the line 37—37 of Fig. 36.

Fig. 38 is a detail, sectional view, taken on the line 38—38 of Fig. 36.

Fig. 39 is a developed view of the type wheels of the consecutive number device and of the other marking type wheels, showing the arrangement of type thereon.

Fig. 40 is a plan view of a list printed by the listing mechanism of this machine.

Fig. 41 is a plan view of one of the tags formed, printed and stapled in this machine.

Figure 1:
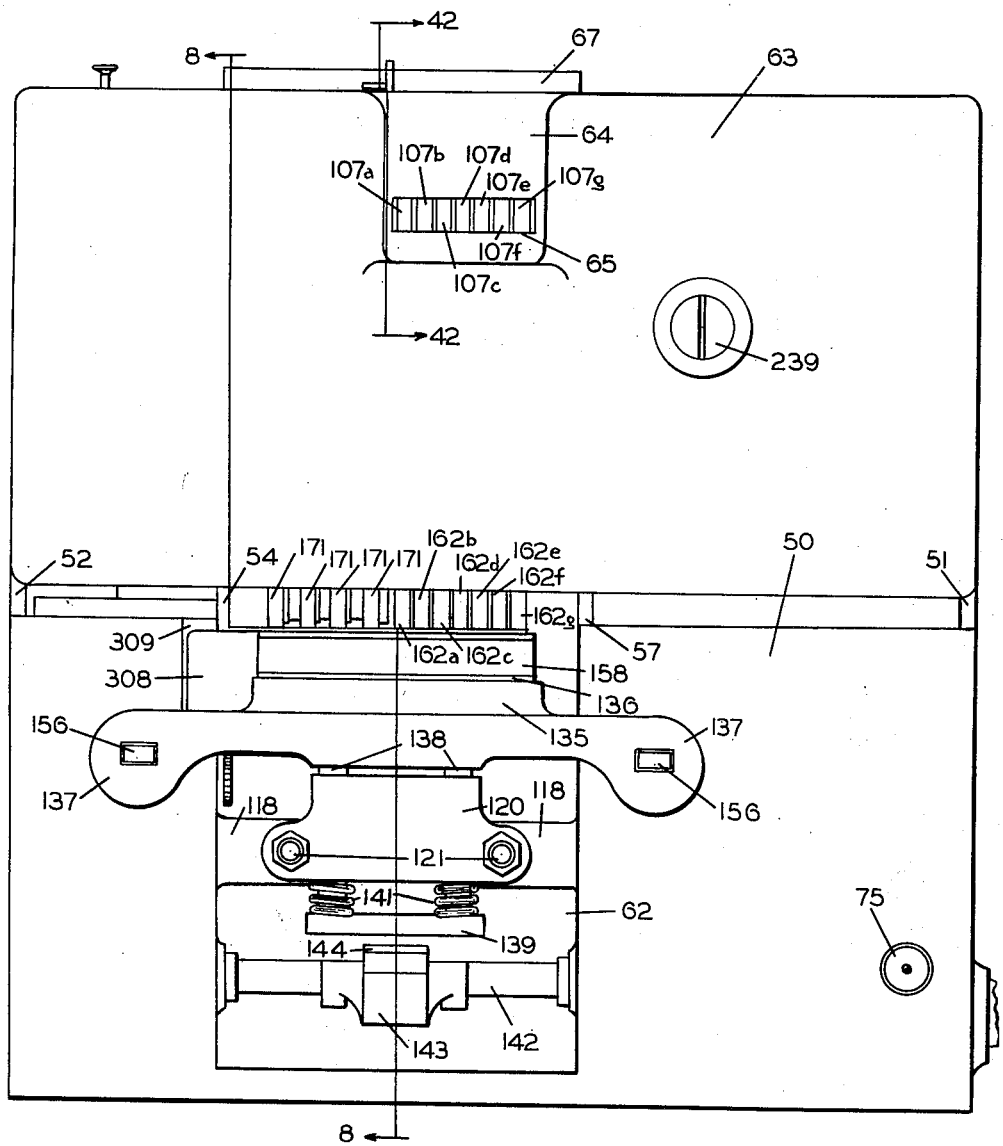
Fig. 1 is a view of the machine in front elevation.
Figure 42:
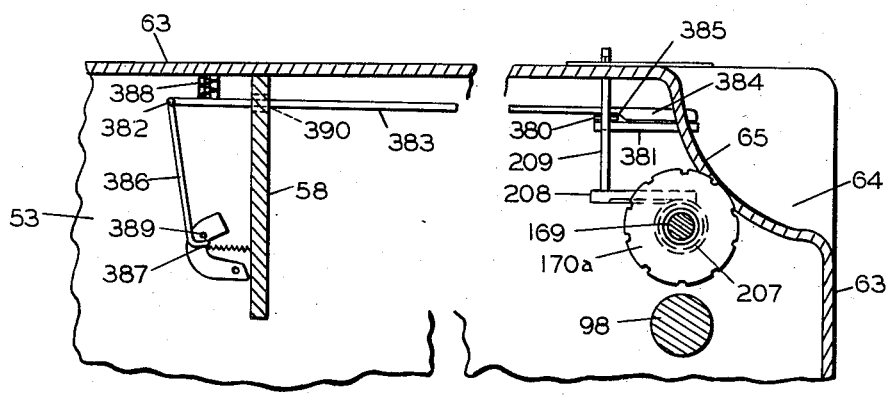

Fig. 42 is a vertical, sectional view, taken substantially on the line 42—42 of Fig. 1, and showing, in side elevation, the settable member for controlling the automatic advance of the consecutive number device and the connections from said member for disabling the impression mechanism of the listing device.

Figure 43:
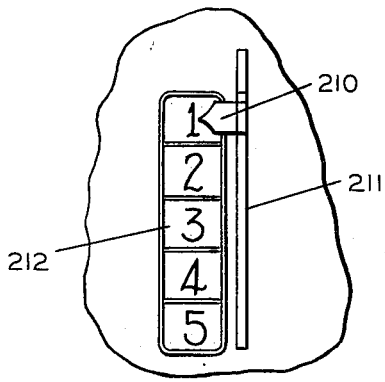

Fig. 43 is a fragmentary, top plan view of the casing of the machine, showing the settable member controlling the automatic advance of the consecutive number device and the indicating scale with reference to which said settable member works.

Figure 44:
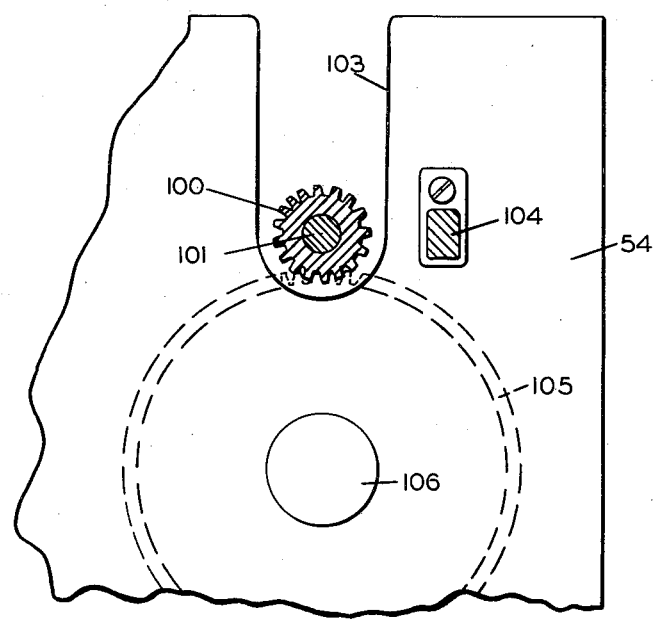

Fig. 44 is a detail, sectional view, taken on the line 44—44 of Fig. 10, and

Figure 45:
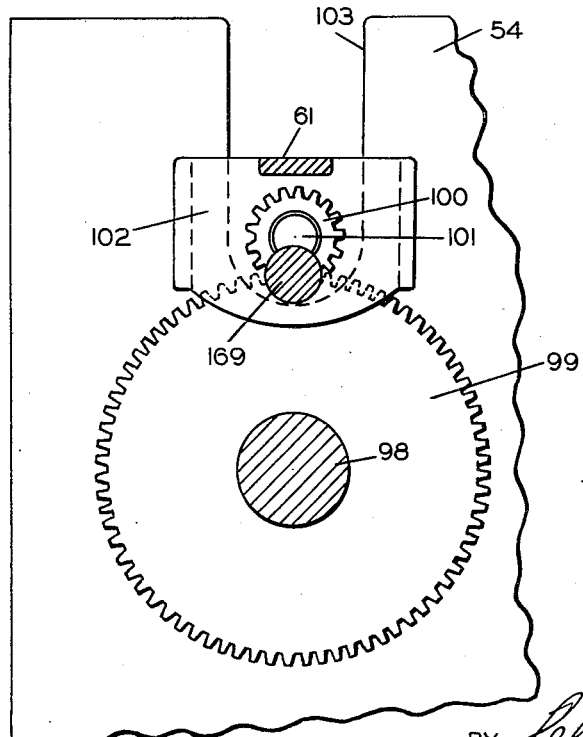

Fig. 45 is a detail, sectional view, taken on the line 45—45 of Fig. 10.

In the drawings, the same reference numerals refer to the same parts throughout the several views, and the sectional views are taken looking in the direction of the arrows at the ends of the section lines.

In general, the machine embodying our invention includes means for feeding a tape across a movable platen, means for severing the tape to form a tag, means for printing a consecutive order number and identifying data upon the tag thus formed, and means for cutting a length of wire, forming the length of wire into a staple, driving the staple through the tag and a garment supported on the platen, and clinching the staple to attach the tag to the garment. The consecutive order number is to be printed by the type-wheels of a consecutive number device and the machine includes means for automatically advancing said consecutive number device to print the next consecutive number. Means are provided by which the mechanism may be set so that the consecutive number type-wheels will be automatically advanced at the end of a predetermined series of cycles of operation. The machine includes, also, a series of type-wheels or type-carriers forming part of a listing mechanism by which the consecutive order number and the identifying data are also printed on a record sheet, and the type-carriers of this listing mechanism are controlled from the type-carriers of the tag-printing mechanism, so that the adjustment of certain indicating and setting wheels will set the marking type-carriers and the listing type-carriers to print the same identifying data. The listing type-carriers for printing the consecutive order number are controlled by and automatically advanced with the type-carriers used for printing said number on the tag. Means are provided whereby the impression mechanism for printing a list on a record sheet is automatically disabled, for all except the last of a series of cycles, and, to this end, connections are provided with the setting member that controls the automatic advance of the consecutive number type-wheels.

Referring to the numbered parts of the drawings, the machine constituting an embodiment of our invention has a base 50 and upstanding side walls 51 and 52 (Fig. 2). Intermediate the side walls and parallel thereto, are the partition walls 53 and 54, extending from front to rear of the machine. A front wall 55 extends between the forward ends of side wall 51 and partition wall 53, and wall 56 extends parallel to front wall 55 from the partition wall 53 toward the side wall 51. The central portion of base 50 is cut out to form a longitudinally extending recess 62, having a rear wall 57. Another partition wall 58 extends between said walls 53 and 54 near the rear thereof. The structure is strengthened by the cross members 59, 60 and 61, which extend between the upper parts of partition walls 53 and 54. Casing 63 (Figs. 1 and 8) having a front wall, a top wall and a rear wall, is removably supported upon the tops of the partition walls 51, 52, 53, 54 and 58. The rear wall of casing 63 extends down slightly below the top of the base 50 and the front wall of said casing terminates slightly short of the top of said base. A recess 64 (Figs. 1 and 11) is depressed in the front wall and the forward portion of the top wall of the casing, and has an opening 65 therein, through which the indicating and setting wheels extend into position for manipulation by the operator. A slot 66 (Fig. 26) is provided in the top wall of casing 63, through which the record sheet, to be printed on by the listing mechanism, may extend and a tear-off ledge 67 is fixed to said top wall, adjacent the slot 66, to serve as a means for tearing off the protruding portion of said record sheet.

The power for driving the machine is supplied by an electric motor 68 (Figs. 2 and 3), which is mounted on a block 69 secured to the top of base 50, at the right-hand side of the machine midway between the front and back thereof. The motor shaft 70 has a pinion 71 fast thereon, which meshes with a gear 72 fast on a shaft 73, journaled at one end in the side wall 51 and at the other end in a bracket 74 extending upwardly from base 50. The current to the motor is controlled by a switch 75 mounted on the front of the machine (Fig. 1).

Figures 4, 5:
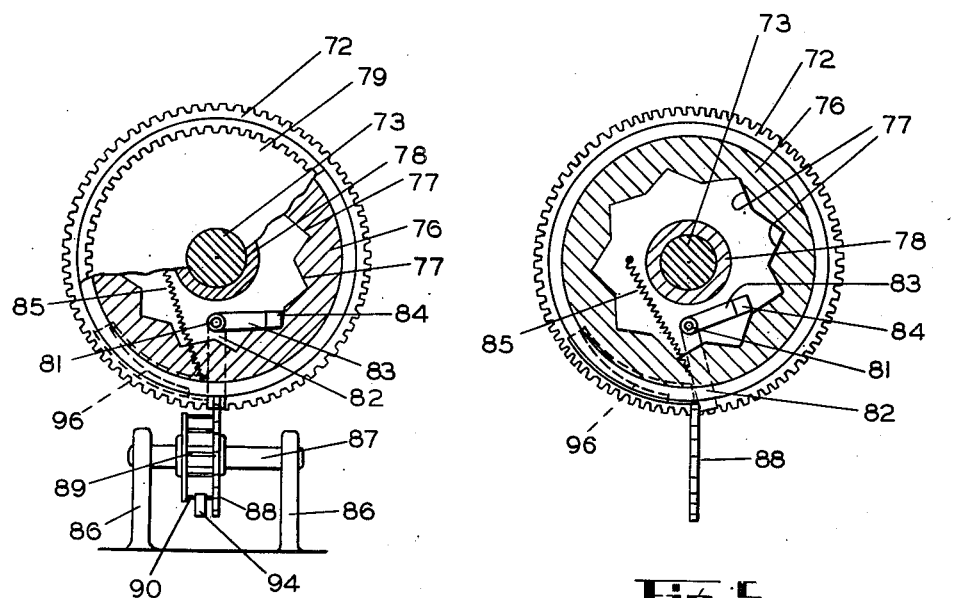
Fig. 4 is a view of the clutch mechanism taken on the line 4—4 of Fig. 3, with a portion of the driving gear broken away, the parts of the clutch being shown in driving relation.
Fig. 5 is a sectional view taken on the line 5—5 of Fig. 3, but showing the parts of the clutch in non-driving relation.

The electric motor 68 is connected to the power shaft of the machine through a one-revolution clutch. One member of this clutch is formed by the annular flange 76 fixed to and extending laterally from the gear 72, the inner periphery of this flange being provided with a plurality of angular notches 77 (Figs. 4 and 5). A sleeve 78 is journaled on shaft 73 and the driven gear 79 is fixed to the inner end of sleeve 78. Gear 79 has an outwardly projecting hub 80, upon which a clutch lever is pivoted by the pin 81. The clutch lever has a downwardly extending arm 82 and a laterally extending arm 83, the latter being provided with a clutch finger 84 extending therefrom into the space within the annular flange 76. A spring 85, connected between a point on hub 80 and the arm 82, tends to rock the clutch lever clockwise (Figs. 4 and 5) to bring the finger 84 into engagement with one of the angular notches 77 in flange 76. Flange 76 rotates constantly with gear 72, when the motor is in operation, and, when the clutch lever is rocked to bring finger 84 into engagement with one of the annular notches 77, the rotary movement of flange 76 is transmitted to hub 80 and thereby to the driven gear 79.

A toothed stop member 88 is mounted on a spindle 87, journaled in the arms of bracket 86 on base 50. Stop member 88 has a plurality of teeth on the periphery thereof separated by notches and, in the normal position of the parts, the lower end of arm 82 of the clutch lever is held by spring 85 in engagement with the side of one of the teeth of stop member 88, thus holding the clutch finger 84 out of engagement with the notches 77 so that gear 72 and flange 76 rotate freely without driving gear 79. A lantern wheel 89, having a plurality of pins 90, is mounted on the spindle 87 and fixed to the stop member 88. The core 91 (Fig. 3) of a solenoid 92 is pivotally connected to a drawbar 93 having a shoulder 94, adapted to engage one of the pins 90 of said lantern wheel. The drawbar is held with said shoulder in engagement with pin 90 by means of spring 95, connected at one end to the free end of the drawbar and at the other end to the wall 51. A cam 96 is fixed to the side of gear 79 (Figs. 3, 4 and 5) and is adapted to engage the side of the tooth of stop member 88 that is engaged by the arm 82 of the clutch lever. The circuit to solenoid 92 includes a source of current and several switches, to be referred to hereinafter, and, when said circuit is closed and the solenoid 92 energized, core 91 will be drawn to the left (Fig. 3), thus rotating lantern wheel 89 and stop member 88 clockwise until the space between adjacent teeth of the stop member is in line with the arm 82 of the clutch lever, when spring 85 pulls said arm 82 into such space, rocking the clutch lever clockwise so that the clutch finger 84 is in driving engagement with one of the notches 77. Thereupon, the constantly rotating gear 72 and flange 76 drive the hub 80 and the gear 79 clockwise (Figs. 4 and 5). Cam 96 revolves with the hub 80 and, toward the close of the revolution the cam engages the adjacent tooth of stop member 88 and rotates that stop member still further clockwise, until the tooth is in the path of the arm 82 of the clutch lever, so that, at the end of said revolution, said arm engages the side of said tooth and the clutch lever is rocked counterclockwise against the tension of spring 85, to the disengaged position shown in Fig. 5. Spring 95 permits the yielding of the drawbar 93 so that the next pin 90 of the lantern wheel may press it to one side until said pin is in front of the shoulder 94, when the spring 95 pulls said shoulder into engagement with said pin. Thus, when the solenoid 92 is energized, the driving and driven members of the clutch are connected and the gear 79 is driven through one revolution, and said clutch members are automatically disconnected at the end of said single revolution.

The gear 79, driven by the one-revolution clutch, meshes with a gear 97 (Fig. 2), which is fast on a main power shaft 98, journaled in the side wall 51 and the partition walls 53 and 54. Shaft 98 terminates at the partition wall 54 (Fig. 2). Gear 99 (Figs. 2, 10 and 45) is fast on the shaft 98, adjacent the partition wall 54, and meshes with a long pinion 100 housed within a bracket 102, secured to the partition wall 54 and extending inwardly therefrom. Spindle 101 of said long pinion is journaled in a bracket arm 104, which is secured to the outer side of partition wall 54, and said partition wall has a downwardly extending notch 103, in which the long pinion 100 is located (Figs. 44 and 45). The long pinion 100 also meshes with a gear 105 on the outer side of the partition wall 54, which is fast on a shaft 106, the outer end of which is journaled in the side wall 52 while the inner end thereof is journaled in a bracket 250 to be described hereafter.

Gear 99 meshes with a gear 107, journaled on a stud 108 carried by the partition wall 54, and gear 107 meshes with a gear 109, fast on a stud 110, journaled in the wall 54. Gear 109 meshes with a gear 111, journaled on a stud 112 mounted on the base 50 (Figs. 6 and 8). Gear 109 also meshes with a gear 113 fast on a shaft 114, journaled in bearings in the base 50 and turning within the recess 62 of said base. A gear 115 is also fast on the stud 110 (Fig. 6) and meshes with a gear 116, journaled on a stub shaft 117 carried by the partition wall 54. The recess 62 in the base is laterally enlarged to accommodate gear 115 and the upper portions of gears 113 and 115 lie on opposite sides of the lower portion of the partition wall 54.

A pair of guide bars 118 (Figs. 6 and 8), attached to the base 50 and projecting laterally into the recess 62 thereof, each have a longitudinally extending bore 119. A platen-carrying frame 120 has secured thereto a pair of parallel, forwardly-extending rods 121, which are slidable in the bores 119. The rear portions of the rods 121 are hollow, providing the longitudinally-extending bores 122, in which rods 123, fast to the base 50, are slidable. Compression springs 125 are interposed between the rear ends of the rods 121 and the shoulders 124 of rods 123, surrounding the latter and, when the platen frame 120 is moved from the normal to the printing position, the rods 123 slide within the bores 122 and the springs 125 are compressed.

The left-hand one of the rods 121 has a recess 126 in the upper surface thereof (Figs. 6 and 8), and a latching block 127 adapted to fit in said recess is carried by a leaf spring 128, secured to the upper surface of the corresponding guide bar 118. A recess 129 is provided in said guide bar to accommodate the gear 111 and the block 127. When the platen-carrying frame 120 is moved from normal to printing position, the recess 126 is brought opposite block 127 and spring 128 causes said block to snap into said recess, which holds the platen-carrying frame in the printing position. A disc 130 is fixed to the side of gear 111 and carries a stud 131. A pin 132 projects laterally from the side of block 127 and, as gear 111 and disc 130 complete a revolution counterclockwise (Fig. 8), stud 131 engages pin 132 and lifts the latching block 127 out of recess 126, so that springs 125 can project the platen-carrying frame 120 from the printing to the normal position.

A switch 133 is carried by the forward end of the left-hand guide bar 118, in such position as to be engaged by a bracket 134 on the platen-carrying frame 120, when the latter is in printing position, to close the switch. The switch 133 is of such type that it opens automatically, when the pressure on it is released by the movement of the platen-carrying frame from printing position. This switch 133 is included in a circuit with solenoid 92 and two other switches, to which reference will be made hereafter.

Mounted upon the frame 120, for vertical movement with respect thereto, is a platen block 135, having a platen 136 on the upper surface thereof toward the rear, and the forward portion of this platen block is provided with a pair of laterally extending handles 137, by means of which the operator may shift the platen-carrying frame 120 to printing position, while holding a garment or other piece of material over the platen 136. Two parallel, vertical pins 138 are slidably mounted in the vertical bores 140 of the platen-carrying frame 120, the upper ends of said pins being secured to the platen block 135, while the lower ends are secured to a cross bar 139, located below the platen-carrying frame. Compression springs 141, surrounding the pins 138, are interposed between the lower face of the frame 120 and the cross bar 139. In the recess 62, centrally of the machine, is a lifter lever 143, mounted on a transverse shaft 142, the ends of which are journaled in bearings formed on the base 50 in the sides of said recess 62. A head 144 is provided on the forward end of lever 143. A socket 145 is formed in the rear end of said lever, in which is mounted the tongue 146 of a block 147, which is fixed to a pin 148 that extends laterally into the lower end of a pitman 149 (Fig. 7). A cam 150 is fast on shaft 114, adjacent the right side of recess 62, and this cam has a cam groove 151 therein. A lever 152 is pivoted to a fixed part at 153 and carries a roller stud 154 working in the groove 151 of the cam. The forward end of lever 152 is pivotally connected to the upper end of the pitman 149, which extends downwardly through a slot 145 provided in the right-hand guide bar 118. When the platen-carrying frame is moved inwardly to place the platen 136 in printing position, the cross bar 139 will be move to a position above the head 144 of lifter lever 143. When the machine is caused then to go through a cycle of operation, the revolution of shaft 114 driving cam 150 will force down pin 148 and hold it down for part of a revolution, thus rocking lever 143 clockwise (Fig. 8) and causing head 144 to push upwardly on cross bar 139, which will move the platen block 135 and the platen 136 upwardly against the pressure of springs 141, to press the tag, supported on a garment held on the platen, against the tag-printing type at the marking printing line to take an imprint therefrom. Switches 156 are provided on the forward portions of handles 137, which may be held closed by the operator while holding a garment upon the platen 136. These switches 156 are connected in series with each other and with switch 133, in a circuit including the solenoid 92 and a source of current and, when both the switches 156 are closed and the platen frame is moved to the printing position so as to close the switch 133, solenoid 92 will be energized to operate the clutch and cause the machine to go through a single cycle of operation.

An arm 157 extends forwardly from the platen-carrying frame 120 and supports an inking device including an ink reservoir 158, an inking roller 159 and a wick 160 connecting the reservoir with the surface of said roller (Figs. 8, 11 and 12). When the platen-carrying frame is moved inwardly from normal to printing position, the inking roller 159 rolls over the tag-printing type at the marking printing line and applies the ink thereto.

Journaled on a transverse shaft 161, which extends across the machine from the partition wall 53 to the partition wall 54 (Figs. 1, 2 and 10) are a plurality of tag-marking type-wheels 162a to 162g inclusive. Each of these wheels has type faces on the periphery thereof and a development of these type-wheels is illustrated in Fig. 39. The two left-hand type wheels, 162a and 162b, have type on their peripheries for printing the digits 0 and 1 to 9, inclusive, and these two type wheels are reserved for printing the route number. The other five type wheels, 162c to 162g, inclusive, have type on their peripheries for printing various marks or characters concerning the condition of the goods or garments sent to be dry cleaned, or other data with respect thereto. Thus, the type wheel 162c has on its periphery type for printing characters to indicate "one piece," "two piece," "coat and two trousers," "three piece," "four piece," "five piece," "six piece," "seven piece," and "eight piece." The type wheel 162d has type on its periphery for printing other marks characterizing or identifying the work, such as "men's," "ladies'," "boys'," "girls'," "de luxe," "ties," "curtains," "rugs," and "drapes." The type wheel 162e has type on its periphery for printing other characterizations of the work, such as "suit," "dress," "pants," "coat," "overcoat," "skirt," "dress suit" and "tuxedo." The type wheel 162f has type on its periphery for printing marks or characters to indicate the color of the garment to be cleaned, such as "black," "white," "blue," "gray," "green," "tan," "red," "brown" and "mixed." The type wheel 162g has type on its periphery for printing certain characters to indicate other things about the garment to be dry cleaned, such as "bad condition," "press," "store," "repair," "worn," "holes," and "burnt." These type wheels 162, therefore, can be set up to print the number of the route from which the garments are received, and various selected characters to indicate certain data regarding the particular work to which the tag is applied.

A gear 163 is fast to the side of each of the type wheels 162 and meshes with a gear 164 journaled on a transverse shaft 165, mounted in the partition walls 53 and 54 (Fig. 11). Gear 164 meshes with a gear 166 journaled on a transverse shaft 167, also mounted in the partition walls 53 and 54, and gear 166 meshes with a pinion 168 secured to the side of a setting and indicating wheel 170, said wheels 170 and pinions 168 being journaled on the transverse shaft 169, the ends of which are mounted in the partition walls 53 and 54. The peripheries of the setting wheels 170 project through the opening 65 in the casing 63, so that those peripheries can be seen by the operator and can be manipulated by him to set them to display the desired numbers and characters. The setting and indicating wheels 170 have on their peripheries numbers and characters corresponding to the numbers and characters on the peripheries of the type wheels 162, and the gearing connecting each setting and indicating wheel with a corresponding type wheel is such that, when the setting wheel 170 is adjusted to display in the opening 65 a number or character, the corresponding type wheel 162 will be set to present at the marking printing line the same number or character type.

Four consecutive number type wheels 171 (Figs. 1, 2 and 10) are journaled on shaft 161, to the right of the marking type wheels 162a to 162g, inclusive. The type wheels of the consecutive number device are provided with tens-transfer mechanism and comprise the units, tens, hundreds and thousands orders, reading from right to left of the set (Fig. 10). As shown in the developed view (Fig. 39), these four type wheels have the digits 0 and 1 to 9, inclusive, on the peripheries thereof. Arranged at the left-hand side (Fig. 10) of the units order consecutive number type wheel 171, and fast thereto, is a disc 172 (Fig. 32) having a single tooth 173 for cooperation with the ten notches 175 of a star wheel 174, journaled on the counter shaft 176. This counter shaft is journaled in hangers 177 (Figs. 10 and 12) depending from the cross brace 60, one of said hangers being in line with the units order consecutive number type wheel and the other in line with the thousands order consecutive number type wheel. As shown in Fig. 32, the star wheel 174 has ten equally spaced notches 175. When the units order type wheel 171 passes from 9 to 0, the tooth 173 of disc 172 engages a notch 175 of star wheel 174 and imparts to that star wheel one-tenth of a revolution. A pinion 178, the pitch line of which is indicated in Fig. 34, is fast to the units order star wheel 174 and arranged at the left thereof (Fig. 10). This pinion 178 meshes with a pinion 179 fast to the tens order type wheel 171 and arranged to the right thereof. A one-tooth disc 172 is fast to the tens order type wheel 171, at the left thereof, and cooperates with a star wheel 174 journaled on the shaft 176, which star wheel has fast thereto another pinion 178 which meshes with the pinion 179 fast to the hundreds order type wheel 171. The hundreds order type wheel 171 has a one-tooth disc 172, fast to the left-hand side thereof, which cooperates with a star wheel 174 journaled on the shaft 176, to which is fast a pinion 178 which meshes with the pinion 179 fast to the thousands order type wheel 171. It will be apparent, therefore, that, each time a type wheel passes from 9 to 0, the type wheel of the next higher order will be advanced one-tenth of a revolution.

Fast to the right-hand side of the units order type wheel 171 is a pinion 180 (Fig. 36), which meshes with a gear 206 journaled on the shaft 165 (Fig. 12). Gear 206 meshes in turn with gear 181 journaled on shaft 167. A ratchet wheel 182, journaled on shaft 167, is fixed to the gear 181 to turn therewith (Fig. 36). An arm 183 is mounted on shaft 167 to rock about the axis thereof, said arm being pulled clockwise, (Fig. 37) by a spring 184, one end of which is connected to the arm and the other to a fixed stud on the frame. The clockwise movement of the arm 183 is limited by engagement with a stop 185. A pawl 186 is pivoted on the arm 183 and pressed into engagement with ratchet wheel 182 by a leaf spring 187. The arrangement is such that the counterclockwise rocking of arm 183, by means to be described hereinafter, will rotate ratchet wheel 182, gears 181 and 206 and pinion 180, sufficiently to advance the units order type wheel 171 one-tenth of a revolution. A pusher link 189 has one end thereof pivotally connected to the arm 183 at 188, and the opposite end of said pusher link has a notch 190 formed therein. An indexing disc 191 is rotatably mounted on the shaft 169 and carries a laterally-projecting pin 192, which, in the normal position of the indexing member, engages the notch 190 of the pusher link 189, as shown in Fig. 37. A stop 193 limits the clockwise movement of pusher link 189 with respect to arm 183. A ratchet wheel 194 is revolubly mounted on the shaft 169 and fixed to turn with the indexing member 191. A pawl-carrier 195 is mounted on shaft 169 to oscillate thereon and a pawl 196 is pivoted on said pawl-carrier and adapted to engage the teeth of ratchet wheel 194, being pressed into engagement with said teeth by a leaf spring 197. The pawl has a cam surface 198 adjacent its pivot, which is adapted to be engaged by a fixed pin 199 projecting through an arcuate slot 200 in the pawl-carrier. The arrangement is such that, when the pawl-carrier 195 is in normal position, pin 199 engages the cam surface 198 of pawl 196 and holds the pawl out of engagement with the teeth of ratchet wheel 194, against the pressure of spring 197. As soon as the pawl-carrier moves from the normal position, the cam surface 198 moves away from pin 199 and the spring 197 is free to move the pawl 196 into engagement with the teeth of the ratchet wheel to advance the latter.

A pitman 201 is pivotally connected at 202 to one arm of the pawl-carrier 195, and said pitman is forked and straddles the power shaft 98. The pitman carries a roller stud 203, which engages in the cam groove 204 of cam 205 fast on the shaft 98. When the power shaft 98 is given a revolution counterclockwise (Fig. 37), cam groove 204 moves the pitman 201 upwardly and then returns it to the position shown. This takes place during the closing portion of the cycle. This rocks the pawl-carrier 195 counterclockwise and, then, returns it clockwise to the normal position, thus advancing the ratchet wheel 194 and the indexing member 191 counterclockwise from the position shown in Fig. 37. This movement causes pin 192 to push link 189 to the left, thus rocking arm 183 counterclockwise so as to advance the units order type wheel 171 one-tenth of a revolution. When the pawl-carrier 195 starts to move clockwise, in its return to its normal position, spring 184 becomes effective to rock arm 183 clockwise to its position against stop 185, and this moves link 189 to the left and, by reason of its engagement with pin 192, returns the indexing member 191 to the normal position. When in normal position, pawl 196 is out of engagement with ratchet wheel 194, so that said ratchet wheel and indexing member 191 can be moved clockwise, by means now to be described.

A pinion 207 is rotatably mounted on the shaft 169 and fixed to the indexing disc 191 to rotate therewith. A slidably mounted rack 208 meshes with pinion 207 and said rack has an upwardly-extending setting arm 209 thereon (Figs. 38 and 42), which extends upwardly through a slot 211 (Fig. 43) in the top wall of casing 63. A pointer 210 is provided on the upper end of the setting arm 209, which is movable over an indicating scale 212, fixed to the top wall of the casing. When the indexing disc 191 is in normal position, pointer 210 stands opposite the numeral 1 on scale 212 and, at each cycle of operation, with the pointer in this position, the units order type wheel 171 will be advanced automatically one-tenth of a revolution. If the pointer 210 is moved forwardly in slot 211 from its normal position, for instance, to a point opposite the numeral 3, the indexing disc 191 (Fig. 37) will be rotated clockwise two steps to the rear of normal. At the first cycle of operation following this setting of the pointer 210, the cam 205 rocking the pawl-carrier 195 will advance the disc 191 one step, and the pointer will move from 3 to 2. At the next cycle of operation, the disc 191 will be advanced another step to the normal position shown in Fig. 37, and the pointer will move from 2 to 1. At the third cycle of operation, the disc 191 will be advanced from and returned to normal position and the units order type wheel will be advanced one-tenth of a revolution as already described. Thus, when the setting arm is moved so that the pointer is opposite the numeral 3 on the scale 212, the apparatus for automatically advancing the consecutive number device to print the next consecutive number will be set so as to operate automatically in the third of three successive cycles of operation. This permits the operator to print three tags at these three successive cycles, each of which will bear the same consecutive number, and the consecutive number device will be automatically advanced during the last of these three cycles.

A shaft 213 (Figs. 2, 10, 11 and 12) extends transversely of the machine, near the rear thereof, between the partition walls 53 and 54 and a set of listing type wheels is journaled on said shaft. This set includes seven listing type wheels 214, having type on their peripheries corresponding to those of the marking type wheels 162 and to the indications on the setting and indicating wheels 170. The peripheries of the listing type wheels 214 project through a slot 215, formed in the transverse partition 58 (Fig. 11). A pinion 216 is revolubly mounted on the shaft 213 and fixed to the left-hand side of each type wheel 214, and each pinion 216 meshes with a gear 217 journaled on the transverse shaft 218, which extends from the partition wall 53 to the wall 54. The gears 217 mesh with the corresponding gears 166 journaled on shaft 167. The gearing is such that, when the setting and indicating wheels 170 are adjusted manually to display certain characters through the display opening 65 at the front of the machine, the marking type wheels 162 and the listing type wheels 214 will be adjusted simultaneously to present the same type at the marking and listing printing line.

The set of listing type wheels includes four type wheels 219 journaled on the shaft 213 to the left of the type wheels 214 (Fig. 10), which type wheels have the digits 0 and 1 to 9, inclusive, on their peripheries and are for use in printing on the list the consecutive number that is printed on the tag. A pinion 220 is revolubly mounted on the shaft 213 and fixed to the right-hand side of the units order type wheel 219. This pinion meshes with a gear 221 journaled on the shaft 218, which gear meshes with the gear 181 (Fig. 12). The gearing is such that, when the units order consecutive number type wheel 171 is advanced one-tenth of a revolution automatically, to set the consecutive number device to print the next consecutive number on the tag, the units order type wheel 219 will be correspondingly advanced a tenth of a revolution, so that it also will be in position to print the next consecutive number. The listing type wheels 219, for printing the consecutive number, are connected by tens-transfer devices identical with those used for the marking type wheels for printing the consecutive number, and illustrated in Figs. 32 to 35, inclusive. The tens-transfer devices include pinions 223, corresponding to the pinions 178, journaled on a shaft 222, corresponding to the shaft 176, and carried by the hangers 224, which depend from the cross member 59 (Fig. 12). These tens-transfer devices also include single-tooth discs, corresponding to the transfer discs 172, and star wheels corresponding to the star wheels 174, heretofore described.

Mechanism is provided for feeding tape over the platen, on which a garment is held by the operator, and such tape-feeding mechanism is illustrated in Figs. 2, 23, 24 and 25. A reel 225 (Fig. 25) is journaled by the axle 227 on the upper end of a bracket 228, which is fast to the side of the base 50 of the machine. This reel holds a coil of tape 226, which is fed therefrom through an opening (not shown) in the side wall 51, and between an upper corrugated roll 229, mounted on the shaft 230, and a lower corrugated roll 231, mounted on the shaft 232 (Fig. 24). Shaft 230 is journaled in the partition walls 55 and 56 (Fig. 2). The lower corrugated roll 231 is housed in a recess 233, provided in the base 50 (Fig. 24), and shaft 232 is journaled in bearings provided in the front and back walls of said recess. A gear 234 is fast on the shaft 230 (Fig. 23). Gear 230 meshes with a mutilated gear 235, which is journaled on a headed stud 239, secured to the front wall 55 and projecting through a suitable opening provided therefor in the casing 63. The mutilated gear 235 has teeth on one-third of its periphery, while the remaining portion of the periphery has the teeth removed, as indicated at 236 (Fig. 2). A bevel gear 237 is fast to the mutilated gear 235 and meshes with a bevel gear 238 of the same diameter which is fast on the power shaft 98. When the power shaft 98 is given one revolution upon the energizing of solenoid 92, the mutilated gear is driven through bevel gears 238 and 237 and caused to make a single revolution. During the first half of this revolution the mutilated gear 235 drives the gear 234 and the upper corrugated roll 229, so as to feed a length of tape T to the left (Fig. 2), over the garment held on the platen at printing position by the operator. The mark is to be printed on this length of tape, which is to be subsequently severed and stapled, if desired, to the garment.

An imprint is made upon the portion of the tape T, fed over the garment supported on the platen 136, by forcing said platen, the garment thereon and the portion of tape, upwardly against the type of the marking type wheels 170 and 171, that are at the marking printing line. The mechanism by which the platen is forced upwardly, to print on the tape or tag, has already been described. At the proper point in the cycle of operation, the rise of cam groove 151 in cam 150, which is fast on shaft 114, rocks the lifter lever 143 clockwise (Fig. 8) so that the head 144 thereof engages the cross bar 139 and forces the platen block 135 upwardly, against the pressure of springs 141, to make an imprint on the tape or tag extending over the garment supported on the platen 136.

This machine includes a stapling mechanism comprising means for feeding wire, means for cutting off a length of wire suitable to form a staple, means for bending said length of wire over an anvil to form the staple, and means for driving said staple through the end of the tape and the garment supported on the platen, and for clinching said staple on an anvil extension of the platen. The stapling mechanism is mounted on a base plate 240, which is attached to the top of the base 50 at the left side of the machine. A threaded stud 241 (Figs. 13 and 19) extends upwardly from the base plate 240 and a spool of wire 242 is mounted so as to rotate on said stud, being retained thereon by a nut 243. The wire extends from the spool 242, through a wire guide 271 carried by the base plate 240, and thence between feed wheels 245 and 244 (Figs. 13 and 14), the former of which has a peripheral groove 246 in which the wire seats. The upper feed wheel 245 is fast on a short shaft 247, journaled in a bracket 248 extending upwardly from the base plate 240 and in an arm 249, which extends rearwardly from a forwardly and upwardly extending standard 250. A ratchet wheel 251 is fixed on the shaft 247 (Fig. 22) and engaged by a pawl 252, pivoted on a pawl-carrier 253 which is rockable about the shaft 247. The lower end of link 254 is pivotally connected to the pawl-carrier 253 and the upper end of said link is pivotally connected by pin 257 to an arm 255, which is pivotally mounted at 256 on the frame. The pin 257 extends laterally into a cam groove 258 formed in a cam 259, fast on the shaft 106, which, as previously described, receives one revolution for each cycle of operation of the machine. The shape of cam groove 258 is such that, during the first part of the cycle of operation, the pawl-carrier 253 is rocked to advance the ratchet wheel 251 one step, which is sufficient to feed a length of wire for forming a staple. The pawl-carrier is then rocked back into position to engage the next tooth of the ratchet wheel 251, and remains in that position during the rest of the cycle.

A gear 262 (Figs. 13 and 14) is fast on the shaft 247 and meshes with a gear 263 fast on a stub shaft 264, carried by a lever 265 pivoted at 266. The lower feed wheel 244 is also fast on the stub shaft 264 and the lever 265 extends between the feed wheel 244 and the gear 263. The end of the stub shaft extends into a recess 267 in the base plate 240, which recess is enough larger than the stub shaft to permit some play in each direction. The end of lever 265, opposite that which carries the stub shaft 264, is pivotally connected at 269 to the lower end of a stud 268, which is screwed into a threaded bore in the end of the arm 249. A spring 270, interposed between said arm and the head of said stud, tends to prevent the loosening of the stud after once having been adjusted. This stud permits one to rock the lever 265 on its pivot 266 to adjust the bite between the feed wheels 244 and 245. A recess 272 is formed in the base 50, of sufficient size to receive the lower portions of the feed wheel 244 and gear 263.

The wire W passes from between the feed wheels 244 and 245 through a passage 274 in a guide block 273, (Figs. 13, 15, 17 and 18) which is fast to the base plate 240. This guide block has a beveled or inclined face 275, in which the passage 274 terminates. A slide 276 is mounted on the standard 250, so as to reciprocate vertically with respect thereto. This slide is provided with a rearwardly facing, longitudinal channel 277 (Fig. 16), and notches 278 are formed in the lower portions of the side walls of this channel, said notches having flaring mouths 279. The upper ends of these notches are indicated at 290 (Fig. 16) and shallow grooves 291 extend upwardly from the points 290, in line with the notches 278, said grooves being formed in the side walls of channel 277 and of a size to receive the portions of wire forming the legs of a staple. A cutting blade 280 is fastened to the lower end of slide 276 by a screw 281, and has a laterally projecting arm 282 provided with an inclined face 283, which is adapted to bear against the beveled face 275 of the guide block, the lower edge of said face 283 forming the cutting edge of the blade. When slide 276 is moved downwardly, said cutting edge will engage the wire projecting from the end of passage 274 and shear it on a bevel, so as to provide pointed ends for the legs of the staple.

The upper end of slide 276 carries a roller stud 284, working in a cam groove 285 of a cam 286 fast to the shaft 106. The home position of the parts is shown in Fig. 13, and it will be seen that, during the forepart of the cycle of operation but after the wire W has been fed through the passage 274, the slide 276 is moved downwardly to shear the end of the wire projecting from the passage 274, thus forming the length of wire from which the staple is to be made. At this time, the retractable anvil 288 projects horizontally so that the horn 287 thereof lies beneath the path of the wire. As slide 276 descends, portions of the wire move upwardly in the slots 278, until engaged by the tops 290 of the slots at the time that the cutting edge of blade 283 engages the wire to cut it. Further movement downwardly of slide 276 results in bending the ends of the length of wire W over the upper surface 289 of horn 287, so as to form a staple, as shown diagrammatically in Fig. 18a, the legs of the staple lying in the grooves 291.

The retractable anvil 288 is slidably mounted on the base plate 240, (Figs. 20 and 21) and has an opening 292 therein, which receives the lower end of the arm 293 of a bell crank that is pivotally mounted on the standard 250, at 294. The other arm of said bell crank is pivotally connected, at 295, to the lower end of a link 296, the upper end of which is connected by a pin 297 to the end of a lever 298, pivotally mounted at 299. Said pin 297 works in a cam groove 300 of a cam 301 fast on the shaft 106. The cam groove 300 is so shaped that, at the proper point of the cycle of operation the anvil 288 is shifted to the left (Fig. 21) so that the surface 289 of horn 287 is located beneath the path along which the wire W will be fed. The anvil maintains this position until later in the cycle, when the cam withdraws it to the position shown in Fig. 21.

A driving slide 302 (Figs. 13, 15 and 16) is slidably mounted in the channel 277 of slide 276, and has a stud 303, which projects through and is guided in the slot 304 in slide 276. Said stud is pivotally connected to the lower end of a pitman 305, the upper end of which is pivotally connected, at 306, to a crank arm 307 fast on shaft 106. Referring to Fig. 15, it will be seen that the location of crank arm 307 is such that, after slide 276 has been moved downwardly to the full extent of its stroke, to cut off a length of wire and form it into a staple, and after the anvil 288 has been withdrawn to the position shown in Figs. 16 and 18b, crank arm 307 moves the driving slide 302 downwardly, so that it engages the head of the formed staple and presses it downwardly to drive it through the end of the tape, and through the garment on the platen above which the tape rests, and to clinch said staple on an anvil extension 308 of the platen. The driving of the staple is indicated diagrammatically in Fig. 18c. A recess 309 is formed in the side wall of the base 50, to permit movement of the anvil extension 308 to a point beneath the stapling mechanism, where it is in position to clinch the staple 391 as it is driven downwardly.

The stapling mechanism may be disabled, if desired, and this is accomplished by disabling the feed of the wire. The rod 261, to which one end of spring 260 is attached, extends upwardly through the top wall of the casing 63 and has a head 310 on the upper end thereof, by means of which the rod may be shifted vertically. One end of spring 260 is connected to pawl 252 and the other end of the spring has a hook 313 engaging in a slot 312 in a plate 311 fast to rod 261. When said rod is in the position shown, and pawl-carrier 253 is rocked, the hook moves from the upper to the lower end of slot 312 without tensioning the spring. When rod 261 is moved upwardly from the position shown in Fig. 22, the hook 313 of spring 260 will engage the lower end of slot 312 and pawl 252 will be pulled out of engagement with the ratchet wheel, the spring stretching as the pawl-carrier is rocked, and the oscillation of the pawl-carrier 253 is without effect to feed the wire W. A detent 314, pivoted to casing 63 at 314, may be moved under head 310 of rod 261, when the latter is lifted, and serves to hold the rod 261 in the upper position.

The machine includes means for cutting off the portion of the tape T, which has been fed over the platen 136, to form the tag attached to the garment held on the platen. This tape cut-off mechanism is arranged near the front of the machine, just to the right of the partition wall 53, which wall, of course, has a slot through which the tape may be fed over the platen 136. The cut-off mechanism includes a stationary blade 315, mounted on the base 50, to which a movable blade 316 is pivoted at 317. The free end of the movable blade is pivotally connected, at 318, to the lower end of a pitman 319, the upper end of which is pivotally connected by a pin 320 to one end of an arm 321, which is pivoted to the framework at 322. Pin 320 carries a roller stud 323 working in the cam groove 324 of cam 325, which is fast on the power shaft 98. The shape of the cam groove 324 is such that, during the greater part of the cycle, the movable blade 316 is separated from the fixed blade 315 so that the tape T can be fed between said blades and over the platen 136. Toward the close of the cycle, the cam groove 324 rocks the movable blade 316 clockwise (Fig. 23), so as to cut the tape.

The listing mechanism is located at the back of the machine and comprises means for feeding a paper strip past the listing printing line and for taking an impression from the type of the listing type-wheels at said listing printing line upon the paper. The paper P is carried in a roll on the reel 326 (Fig. 26), the trunnions 327 of which are journaled in the partition walls 53 and 54. From the reel, the paper P passes between the driven feed roll 328 and the idler feed roll 329 and, thence, through loop guides 342, secured to the rear face of the partition wall 58 above and below the opening 215 therein. Thence, the paper tape passes out through the opening 66 in the top wall of casing 63, to the tear-off ledge 67. Intermediate the guides 342, and adjacent the ends of the opening 215, there are mounted on the partition wall 58 the channel guides 343, each having a slot 344 therein, through which the inking ribbon 345 passes, between the paper and the type. A ratchet wheel 330 is fixed to shaft 346 on which driven roll 330 is fast, so as to turn with said roll, and a pawl-carrier 331 is mounted on said shaft to rock about the axis of the roll and the ratchet wheel. This pawl-carrier 331 has a pawl 332 pivotally mounted thereon, which is pressed by a spring 333 into engagement with the teeth of the ratchet wheel 330. A pin 334, carried by the pawl-carrier 331, extends through a slot 335 in the upper end of a link 336, the lower end of which is pivotally connected by a pin 337 to one arm of a lever 338, pivoted at 339 to the framework. This pin 337 carries a roller stud engaging in the cam groove 340 of the cam 341, which is fast on the shaft 114. The shape of the cam groove is such that at the beginning of the cycle of operation, the link 336 is moved downwardly rocking the pawl-carrier 331 so as to advance the driven wheel 330 one step and, then, the pawl-carrier is rocked in the opposite direction to cause the pawl 332 to engage with the next tooth.

The inking ribbon is carried by ribbon spools 349, (Figs. 2, 28, 29, 30 and 31) mounted between the arms of brackets 348, fixed to the outer sides of the partition walls 53 and 54, respectively. The spindles 350 for the ribbon spools pass through the arms of bracket 348 and through another bracket 351 also fast to the adjacent partition wall. The ribbon 345 passes from the spool at one side of the machine, through a slot in the adjacent partition wall, through the slot 344 in the channel guide 343, past the listing printing line of the listing type wheels, through the slot 344 in the channel guide 343 at the other side of the machine, and through a slot in the opposite partition wall to the other spool 349. The spindle 350, for the ribbon spool 349 at the left side of the machine, has a worm gear 352 fast thereon, which meshes with a worm 353 fast on a shaft 354. Shaft 354 has its inner end resting in an arcuate slot 355 in the partition wall 54, and its other end extends through an identical slot in the side wall 52 and has a handle 356 at the outside of that wall, by means of which the shaft may be shifted from one end to the other of the slots. A gear 357, fast on the shaft 354, meshes with the gear 358, journaled on a stud 359, and said gear 357 may roll on the gear 538 when the shaft 354 is moved from the lower to the upper end of the slots and vice versa. Gear 358 meshes with a gear 347, fast on shaft 346 to which the ratchet wheel 330 and the driven roll 328 of the paper feed mechanism are fastened. The spindle 350, for the ribbon spool 349 at the right-hand side of the machine, has a bevel gear 360 fast thereon, which meshes with a bevel gear 361 fast on a stub shaft 362, journaled in the partition wall 53 and a bracket 363. The gear 364, fast on shaft 362, meshes with a gear 365, journaled on a stud 366, and the gear 365 meshes with a gear 367, fast on a shaft 368, which is journaled in the partion walls 53 and 54 and extends from one side of the machine to the other. On the left-hand end of this shaft 368 a worm gear 369 is fastened.

Shaft 346 is advanced, step by step, by the paper feed mechanism and, as it advances, it drives worm 353, through gear 347, gear 358, gear 357 and shaft 354. This drives the worm gear 352 to turn the spindle shaft 350 at the left of the machine. When it is desired to reverse the direction of ribbon feed, the shaft 354 is moved from the lower to the upper end of the arcuate slot 355, so that the worm 353 meshes with and drives the worm gear 369 on the left-hand end of shaft 368. This drives gear 367 and, through gear 365, gear 364, and bevel pinions 361 and 360, drives the spindle 350 for the ribbon spool at the opposite side of the machine, to feed the ribbon in the opposite direction.

A shaft 370 extends through and is journaled in the partition walls 53 and 54 (Fig. 27). A printing hammer 371 is fast on the shaft 370, having its head in line with the listing printing line of the listing type wheels. Depending arms 372 (Fig. 8) are fast to the ends of shaft 370 and springs 373, connected to said arms and to fixed points on the frame, tend to throw the printing hammer forwardly to press the paper and the inking ribbon against the type at the listing printing line. A stud 374 is provided on each arm 372, which is adapted to be engaged by a notch 376 in one arm of a bell crank lever 375' pivoted at 375, the other arm of which bell crank lever extends downwardly and has connected thereto one end of a spring 377, which tends to rock the lever so as to bring notch 376 into engagement with stud 374. Cams 378 and 379 are fast to gear 116 and these cams have lobes so arranged that the cam 378 will, at a predetermined point in the cycle, engage the end of arm 372 and rock the printing hammer 371 clockwise (Fig. 8), to carry it away from the type and bring the arm 372 into position for stub 374 to be engaged by notch 376, of lever 375' which latches the printing hammer in the withdrawn position. The lobs of cam 379 is so arranged that at a predetermined point in the cycle, it rocks the bell crank 375' counterclockwise to withdraw notch 376 from stud 374, so that springs 373 become effective to throw hammer 371 against the rear face of the paper to press it and the inking ribbon against the type at listing printing position and take an imprint therefrom. These cams are so arranged that cams 379 first trip latches 375', to release studs 374 and permit springs 373 to carry hammer 371 against the paper, and cams 378 thereafter rock arms 372 to withdraw the printing hammer to its rearward position, where it is latched as above described. A similar arm 372, spring 373, bell crank latch 375', spring 377, cams 378 and 379, and gear 116 are arranged at the right-hand side of the machine, and driven by suitable connections to the shaft 114, so that the cams 378 and 379, at both sides of the machine, will work in the same timing.

When several tags are printed at successive cycles of operation, each with the same consecutive number and the same route number and other identifying marks, it is desirable to print this consecutive number, and the other markings, but once on the record sheet P of the listing mechanism, and, therefore, means are provided for disabling the impression mechanism for the listing devices, for all except the last of said series of cycles. It will be recalled that the slide 208 (Fig. 42) is moved forwardly to a predetermined position, when the machine is to be set to operate through more than one cycle, without automatically advancing the consecutive number device at each cycle, and that the slide 208 is moved to the rear, step by step, one step for each cycle of operation. A stud 389 (Fig. 42) projects from the right-hand side of the hammer 371 (Fig. 27). A bell crank lever is pivoted at 382 (Fig. 42) and has one arm 386 extending downwardly and provided with a hook 387, at its lower end, adapted to engage the stud 389, when the bell crank is in one position. The other arm 383 of said bell crank extends forwardly, through a slot 390 in the partition wall 58, and has a head 384, which rests upon a ledge 381 secured to the partition wall 54. The rear edge of this head is provided with an inclined cam surface 385. A spring 388 tends to rock the bell crank counterclockwise, so that the hook 387 is in such position that it will not interfere with the movement of the hammer toward the paper to make an imprint. However, the setting arm 209 has a laterally extending bar 380 connected thereto, one end of which rests on the ledge 381, and, when the setting arm 209 is moved forwardly from normal position, this bar 380 engages the cam surface 385 and rocks the bell crank clockwise, to bring the hook 387 to position where it engages the stud 389, and will prevent the movement of the hammer toward the paper to take an imprint. Thus, the impression mechanism is disabled, as long as the slide 208 and the setting arm 209 are in any position in front of the normal position, but, as soon as they return to the normal position, the spring 388 rocks the bell crank counterclockwise so that the impression mechanism is free to operate.

The operation of our machine should be readily apparent from the description given above, but it will be described briefly at this point. It is to be assumed that the switch 75 is turned to the "on" position, so that the electric motor 68 is running and driving motor shaft 70, gear 71, gear 72 and shaft 73. The operator having a garment before him which is to be tagged, adjusts the setting wheels 170a and 170b so that the route number is displayed by said wheels in the sight opening 65, and the marking type wheels, 162a and 162b, and the corresponding listing type wheels 214, are set to print that number. By manipulating the setting wheels 170c to 170g, inclusive, to bring before the display opening 65 the characters indicating the other portions of the mark, and to set correspondingly the type wheels 162 and 214, the operator sets up the proper type for the printing of the mark on the tag and for listing it on the record sheet. The type wheels 171 and 219 of the consecutive number device have been, of course, set to print the next consecutive number, in the course of the last preceding operation. Since there is a single garment to be tagged and, hence, only one tag is to be printed for that garment, the setting arm 209 is left with the pointer 210 opposite the numeral 1, as shown in Fig. 43. The operator places the garment on the platen 136 and holds it thereon, while grasping the handles 137 and closing the switches 156 by pressure of his hands. He, then, forces the platen-carrier 120 rearwardly, by pressure applied through the handles 137, until it reaches its rearmost or printing position, where it is latched by the means heretofore described. At that instant, the switch 133 will be closed, so that the circuit will be completed to energize solenoid 92, which actuates the one-revolution clutch so that the power shaft 98 is driven through a single revolution. In the forepart of this cycle, the tape-feeding mechanism operates to feed the tape T, between the fixed blade 315 and the movable blade 316, and over the garment, which is supported on the platen 136. The stapling mechanism, also, operates to feed the wire W forward and to cut off a length thereof proper to form a staple, and the staple-forming mechanism operates to bend this length of wire over the horn 287 of the projected anvil. About this time, the lifter lever 143 is operated, to force the platen 136 upwardly, so as to press the tape, resting on the garment on the platen, against the type at marking printing position, to print the consecutive number and the mark on this portion of the tape. About this time, the movable anvil 288 is moved to withdraw the horn 287 from the path of the driving slide 302, and it descends to drive the formed staple through the end of the tape and through a portion of the garment supported on the platen, and to clinch this staple on the anvil extension of the platen, which, at this time, is beneath it. Toward the close of the cycle of operation, the movable blade 316 (Fig. 23) is caused to descend to cut the tape and leave the marked portion thereof attached by the staple 391 to the garment, as a tag. At the close of the cycle, the stud 131 (Fig. 8) engages pin 132 and withdraws the latching block 127, so that the springs 125 acting on the rods 121 return the platen from the printing to the normal position. Of course, the lifter lever 143 has returned to its normal position, shown in Fig. 8, before this happens. At the beginning of the cycle of operation, the paper-feeding devices of the listing mechanism operate to feed upwardly the record strip P and, at the same time, the inking ribbon is fed to present a fresh surface opposite the type. Cams 379 operate to trip the latches 375', so that the springs 373 throw the hammer 371 against the paper to print on the list from the listing type at printing position, and soon after the cams 378 operate to withdraw the hammer 371 to the rearward position, where it is again latched by the latches 375'.

In the last part of the cycle, after the platen has moved downwardly away from the type, and after the printing hammer 371 of the listing mechanism has been withdrawn, cam 204 operates to rock pawl-carrier 195, so as to advance indexing disc 191 and, thus, advance the units order type wheel of the consecutive number device, to print the next consecutive number. At the very close of the cycle, the cam 204 permits the return of indexing disc 191 and arm 183 to their normal positions.

If several garments are included in a batch, each of which is to be tagged with an identical tag having the same consecutive number, the setting arm 209 is moved forwardly so that the pointer 210 stands opposite the number indicating the number of garments in the group. As has been explained, the setting arm 209 will be moved rearwardly one step for each cycle of operation, until it reaches the normal position and, during these cycles, the automatic advance mechanism for the consecutive number device will not be operated, so that the units order type wheels for the consecutive number device are only advanced one step in the course of the last of this series of cycles. As has been explained, the impression mechanism for the listing devices is disabled during all except the last of these cycles so that the consecutive number and the mark are only printed once on the record sheet, for each group of tags that are printed having the same consecutive number.

Thus, the machine, controlled by the various cams, selecting devices and interlocking mechanisms, which constitute a selectively operable program control mechanism, will print a tag, such as shown in Fig. 41, having thereon a consecutive number, a route number and certain identifying marks, cut off a portion of tape which has been fed over the platen so as to form the tag, and staple the tag to the garment held on the platen and over which the tape is fed. At the same time, the machine will print on a record sheet a list, such as shown in Fig. 40.

We are aware that the machine herein described is susceptible of considerable variation without departing from the spirit of our invention, and, therefore, we have claimed our invention broadly, as indicated by the appended claims.

Having thus described our invention, what we claim as new and useful and desire to secure by Letters Patent, is:

1. A machine of the class described comprising the combination of a plurality of marking type-carriers, type carried by said type-carriers adapted to print a number; means for automatically adjusting said type-carriers to position the type thereon to print the next consecutive number, after a predetermined series of operations; means for taking an impression on a tag from said marking type-carriers; a plurality of listing type-carriers, type carried by said type-carriers; connections between said marking and listing type-carriers, whereby adjustment of the former to bring selected type to printing position will adjust the latter to bring corresponding type to listing printing position; and means, effective for a predetermined one only of said series of operations, for taking an impression on a record sheet from the type at listing printing position.

2. A machine of the class described comprising the combination of a plurality of marking type-carriers, type carried by said type-carriers adapted to print a number; automatic means for adjusting said type-carriers to position the type thereon to print the next consecutive number; means for setting said automatic means to operate in a predetermined cycle of a series of cycles of operation; means for taking an impression on a tag from said marking type-carriers at each cycle of operation; a plurality of listing type-carriers, type carried by said type-carriers; connections between said marking and listing type-carriers, whereby adjustment of the former to bring selected type to printing position will adjust the latter to bring corresponding type to listing printing position; and means, controlled by said setting means, for taking an impression on a record sheet from the type at listing printing position in said predetermined cycle of operation.

3. A machine of the class described comprising the combination of power means adapted to be given cycles of operation; a plurality of marking type-carriers, type carried by said type-carriers adapted to print a number; automatic means for adjusting said type-carriers to position the type carried thereon to print the next consecutive number; setting means, operable to cause said automatic means to operate in the course of a predetermined cycle of operation; means for taking an impression on a tag from said marking type-carriers at each cycle of operation; a plurality of listing type-carriers, type carried by said type-carriers; connections between said marking and listing type-carriers, whereby adjustment of the former to bring selected type to marking printing position will adjust the latter to bring corresponding type to listing printing position; and means, controlled by said setting means, for taking an impression on a record sheet from the type at listing printing position in the course of said predetermined cycle of operation.

4. A machine of the class described comprising the combination of a plurality of marking type-carriers, type carried by said type-carriers adapted to print a number; means for automatically adjusting said type-carriers to position the type carried thereon to print the next consecutive number in the last of a predetermined series of cycles of operation; means for taking an impression on a tag from said marking type-carriers at each cycle; a plurality of listing type-carriers, type carried by said type-carriers; connections between said marking and listing type-carriers, whereby adjustment of the former to bring selected type to marking printing position will adjust the latter to bring corresponding type to listing printing position; and means for taking an impression on a record sheet from the type at listing printing position, in the course of said last cycle of operation.

5. A machine of the class described comprising the combination of power means adapted to be given cycles of operation; a plurality of marking type-carriers, type carried by said type-carriers adapted to print a number; automatic means for adjusting said type-carriers to position the type thereon to print the next consecutive number, effective during the last cycle of a predetermined series of cycles of operation; means, operated by said power means, for taking an impression on a tag from said marking type-carriers at each cycle of operation; a plurality of listing type-carriers, type carried by said type-carriers; connections between said marking and listing type-carriers, whereby adjustment of the former to bring selected type to marking printing position will adjust the latter to bring corresponding type to listing printing position; and means, operated by said power means and effective during the said last cycle, for taking an impression on a record sheet from the type at listing printing position.

6. A machine of the class described comprising the combination of power means adapted to be given cycles of operation; a plurality of marking type-wheels, type carried by said type-wheels adapted to print a number; automatic means, operated by said power means, for adjusting said type wheels to position to print the next consecutive number during the last of a predetermined series of cycles of operation; means, operated by said power means, for moving a tag against said type-wheels at each cycle of operation to print the consecutive number on said tag; a plurality of listing type-wheels, type carried by said type-wheels; connections between said marking and listing type-wheels, whereby adjustment of the former to bring selected type to marking printing position will adjust the latter to bring corresponding type to listing printing position; and means, operated by said power means during the said last cycle, for moving a record sheet against the type at listing printing position to print said consecutive number thereon.

7. A machine of the class described comprising the combination of a plurality of marking type-carriers, type carried by said type-carriers adapted to print a number; automatic means for adjusting said type-carriers to position the type carried thereon to print the next consecutive number; setting means controlling said automatic means to cause it to operate in the last of a predetermined series of cycles of operation; means for taking an impression on a tag from said marking type-carriers at each cycle; a plurality of listing type-carriers, type carried by said type-carriers; connections between said marking and listing type-carriers, whereby adjustment of the former to bring selected type to marking printing position will adjust the latter to bring corresponding type to listing printing position; means for taking an impression on a record sheet from the type at listing position at each cycle of operation; and means, controlled by said setting means, for disabling said last-mentioned means when the setting means is in predetermined positions.

8. A machine of the class described comprising the combination of a plurality of marking type-carriers, type carried by said type-carriers adapted to print a number; automatic means, operated by said power means, for adjusting said type-carriers to position type carried thereon to print the next consecutive number; setting means controlling said automatic means to cause it to operate during the last of a predetermined series of cycles of operation; means, operated by said power means, for taking an impression on a tag from said marking type-carriers in the course of each cycle of operation; a plurality of listing type-carriers, type carried by said type-carriers; connections between said marking and listing type-carriers, whereby adjustment of the former to bring selected type to marking printing position will adjust the latter to bring corresponding type to listing printing position; and means, operated by said power means and controlled by said setting means, for taking an impression on a record sheet from the type at listing printing position during the said last cycle.

9. A machine of the class described comprising the combination of power means adapted to be given cycles of operation; a plurality of marking type-wheels, type carried by said type-wheels adapted to print a number; automatic means, operated by said power means, for rotatably adjusting said type-wheels to position type carried thereon to print the next consecutive number; setting means controlling said adjusting means to cause it to operate in the last of a series of cycles of operation; means, operated by said power means, for moving a tag against said marking type-wheels at each cycle of operation to print said consecutive number on said tag; a plurality of listing type-wheels, type carried by said type-wheels; connections between said marking and listing type-wheels, whereby adjustment of the former to bring selected type to marking printing position will adjust the latter to bring corresponding type to listing printing position; and means, operated by said power means and controlled by said setting means, for moving a record sheet against the type at listing printing position in the said last cycle only to print said consecutive number on said record sheet.

10. A machine of the class described comprising the combination of power means adapted to be given cycles of operation; a plurality of marking type-carriers; manual means for adjusting said type-carriers to present selected type at marking printing position; a plurality of consecutive number type-carriers adapted to present type at said marking printing position; automatic means, operated by said power means, for adjusting said consecutive number type-carriers to position to print the next consecutive number; setting means, controlling said automatic means, to cause it to operate in the last of a predetermined series of cycles of operation; a plurality of listing type-carriers; connections between said marking and consecutive number type-carriers and said listing type-carriers, whereby adjustment of the marking and consecutive number type-carriers to present type at marking printing position to print a mark and consecutive number will cause adjustment of said listing type-carriers to present corresponding type at listing printing position to print said mark and consecutive number; impression means, operated by said power means, for printing said mark and consecutive number on a tag at each cycle of operation from the type at marking printing position; and means, operated by said power means in a predetermined cycle of said series, for taking an impression from said type at listing printing position on a record to print thereon said mark and consecutive number.

11. A machine of the class described comprising the combination of power means adapted to be given cycles of operation; a plurality of marking type-carriers; manual means for adjusting said type-carriers to present selected type at marking printing position; a plurality of consecutive number type-carriers adapted to present type at said marking printing position; automatic means, operated by said power means, for adjusting said consecutive number type-carriers to position to print the next consecutive number; setting means controlling said automatic means to cause it to operate in the last of a predetermined series of cycles of operation; a plurality of listing type-carriers; connections between said marking and consecutive number type-carriers and said listing type-carriers, whereby adjustment of the marking and consecutive number type-carriers to present type at marking printing position to print a mark and consecutive number will cause adjustment of said listing type-carriers to present corresponding type at listing printing position to print said mark and consecutive number; impression means, operated by said power means at each cycle of operation, for printing said mark and consecutive number on a tag from the type at marking printing position; and impression means, controlled by said setting means and operating during the last of said series of cycles, to print said mark and consecutive number from the type at listing printing position on a record sheet.

12. A machine of the class described comprising the combination of power means adapted to be given cycles of operation; a plurality of marking type-wheels; manual means for rotatably adjusting said type-wheels to present selected type at marking printing position; a plurality of consecutive number type-wheels adapted to present type at said marking printing position; automatic means, operated by said power means for adjusting said consecutive number type-wheels to position to print the next consecutive number; a plurality of listing type-wheels; gearing connecting said marking and consecutive number type-wheels and said listing type-wheels, whereby adjustment of the marking and consecutive number type-wheels to present type at marking printing position to print a mark and consecutive number will cause adjustment of said listing type-wheels to present corresponding type at listing printing position to print said mark and consecutive number; and impression means, operated by said power means, for moving a tag against type at marking printing position, and a record sheet against type at listing printing position, to print said mark and consecutive number on said tag and said record sheet.

13. A machine of the class described comprising the combination of a platen, movable from normal to printing position and vice versa; a plurality of marking type-carriers; means for adjusting said type-carriers to present selected type to said platen; a plurality of listing type-carriers; connections between said marking and listing type carriers, whereby adjustment of the marking and listing type-carrier to present selected type to the platen results in adjustment of the latter to present corresponding type at a listing printing line; means for feeding a tape over said platen; means for feeding a record sheet past said listing type-carriers at the listing printing line; power means, controlled by movement of said platen from normal to printing position; means, operated by said power means, for moving said platen toward said marking type-carrier to make an imprint therefrom on said tape; and impression mechanism, operated by said power means, for making an imprint on said record sheet from the type of the listing type-carriers at the listing printing line.

14. A machine of the class described comprising the combination of a platen, movable from normal to printing position and vice versa; a plurality of marking type-carriers; means for adjusting said type-carriers to present selected type to said platen; a plurality of listing type-carriers; connections between said marking and listing type-carriers, whereby adjustment of the marking and listing type-carriers to present selected type to the platen will result in adjustment of the latter to present corresponding type at a listing printing line; means for feeding a tape over said platen; power means, controlled by movement of said platen from normal to printing position; means, operated by said power means, for moving said platen toward the type to make an imprint therefrom on said tape; means, operated by said power means, for feeding a record sheet past said listing printing line; and impression mechanism, operated by said power means, for making an imprint on said record sheet from the type of the listing type-carriers at the listing printing line.

15. A machine of the class described comprising the combination of a platen, movable from normal to printing position and vice versa; a plurality of marking type-carriers; means for adjusting said type-carriers to present selected type to said platen; a plurality of listing type carriers; connections between said marking and listing type-carriers, whereby adjustment of the marking and listing type-carriers to present selected type to the platen will result in adjustment of the latter to present corresponding type at a listing printing line; power means, controlled by movement of said platen from normal to printing position; means, operated by said power means, for feeding a tape over said platen; means, operated by said power means, for moving said platen toward the type to make an imprint therefrom on the tape fed over said platen; means, operated by said power means, for feeding a record sheet past the listing printing line; and impression mechanism, operated by said power means, for making an imprint on said record sheet from the type of the listing type-carriers at the listing printing line.

16. A machine of the class described comprising the combination of a platen, movable from normal to printing position and vice versa; a plurality of marking type-carriers; means for adjusting said type-carriers to present selected type to said platen; a plurality of listing type-carriers; connections between said marking and listing type-carriers, whereby adjustment of the marking and listing type-carriers to present selected type to the platent results in adjustment of the latter to present corresponding type at a listing printing line; power means, controlled by movement of said platen from normal to printing position; means, operated by said power means, for feeding a tape over said platen; means, operated by said power means, for severing the portion of tape fed over said platen; means, operated by said power means, for moving said platen toward the type to make an imprint therefrom on the tape fed over said platen; means, operated by said power means, for feeding a record sheet past said listing printing line; and impression mechanism, operated by said power means, for making an imprint from the type of said listing type-carriers at the listing printing line upon said record sheet.

17. In a machine of the class described including a power shaft adapted to be given cycles of operation and a consecutive number device having a units order type-wheel, means for automatically advancing said units order type-wheel comprising the combination of a rotatably mounted indexing disc, having a laterally projecting pin thereon; a ratchet wheel, fixed to said disc and concentric therewith; a pawl-carrier, mounted to oscillate about the axis of said ratchet wheel; a pitman, connected to said pawl-carrier; cam means on said power shaft for reciprocating said pitman; a pawl carried by said pawl-carrier and cooperating with said ratchet wheel, said pawl having a cam surface thereon; a fixed pin located to cooperate with said cam surface, to hold said pawl from engagement with the ratchet wheel when the pawl-carrier is in normal position; a pinion concentric with and fixed to said indexing disc; a slidable rack meshing with said pinion; an indexing arm, fixed to said rack and having a pointer thereon; an indicating scale, with reference to which said pointer is movable; a pinion concentric with and fixed to the units order type-wheel; a gear meshing with said pinion; a ratchet wheel fixed to and concentric with said gear; an arm mounted to rock about the axis of said last-mentioned ratchet wheel; a pawl pivoted on said arm and cooperating with said last-mentioned ratchet wheel; a push member pivoted to said arm, with its free end in the path of the pin on said indexing disc; a stop for limiting movement of said push member in one direction about its pivot; a stop for limiting movement of said arm in one direction; and a spring, tending to hold said arm against said last-mentioned stop.

18. In a machine of the class described including a power shaft, adapted to be given cycles of operation, and a consecutive number device having a units order type-wheel, means for automatically advancing said units order type-wheel comprising the combination of a rotatably mounted indexing disc, having a laterally-projecting pin thereon; a ratchet wheel, fixed to said disc and concentric therewith; a pawl-carrier, mounted to oscillate about the axis of said ratchet wheel; a pitman connected to said pawl-carrier; cam means on said power shaft for reciprocating said pitman; a pawl, carried by said pawl-carrier and cooperating with said ratchet wheel, said pawl having a cam surface; a fixed pin cooperating with said cam surface to hold said pawl from engagement with the ratchet wheel when the pawl carrier is in normal position; a pinion concentric with and fixed to said indexing disc; a slidable rack meshing with said pinion; an indexing arm fixed to said rack and having a pointer thereon; an indicating scale, with reference to which said pointer is movable; a pinion concentric with and fixed to the units order type-wheel; a gear meshing with said pinion; a ratchet wheel fixed to and concentric with said gear; an arm mounted to rock about the axis of said last-mentioned ratchet wheel; a pawl pivoted on said arm and cooperating with said last-mentioned ratchet wheel; a push member pivoted to said arm with its free end in the path of the pin on said indexing disc, whereby movement of said indexing disc in one direction from normal position causes said arm to rock about its pivot; and spring means for returning said arm and indexing disc to normal position.

19. In a machine of the class described including a power shaft, adapted to be given cycles of operation, and a consecutive number device having a units order type-wheel, means for automatically advancing said units order type-wheel comprising the combination of a rotatably mounted indexing disc, having a laterally-projecting pin thereon; a ratchet wheel, fixed to said disc and concentric therewith; a pawl-carrier, mounted to oscillate about the axis of said ratchet wheel; a pitman connected to said pawl-carrier; cam means on said power shaft for reciprocatinng said pitman; a pawl carried by said pawl carrier and cooperating with said ratchet wheel, said pawl having a cam surface; a fixed pin cooperating with said cam surface to hold said pawl from engagement with the ratchet wheel when the pawl-carrier is in normal position; a pinion, concentric with and fixed to said indexing disc; a slidable rack, meshing with said pinion; an indexing arm, fixed to said rack and having a pointer thereon; an indicating scale, with reference to which said pointer is movable; a second ratchet wheel mounted to rotate about an axis; driving connections between said second ratchet wheel and said units order type wheel; an arm mounted to rock about the axis of said second ratchet wheel; a pawl pivoted on said arm and cooperating with said second ratchet wheel; a push member pivoted to said arm with its free end in the path of the pin on said indexing disc, whereby movement of said indexing disc in one direction from normal position causes said arm to rock about its pivot; and spring means for returning said arm and indexing disc to normal position.

20. In a machine of the class described including a power shaft, adapted to be given cycles of operation, and a consecutive number device having a units order type-wheel, means for automatically advancing said units order type-wheel comprising the combination of a rotatably mounted indexing disc, having a laterally-projecting pin thereon; a ratchet wheel, fixed to said disc and concentric therewith; a pawl-carrier, mounted to oscillate about the axis of said ratchet wheel; a pitman connected to said pawl-carrier; cam means on said power shaft for reciprocating said pitman; a pawl carried by said pawl-carrier and cooperating with said ratchet wheel, said pawl having a cam surface thereon; a fixed pin, located to cooperate with said cam surface to hold said pawl from engagement with the ratchet wheel when the pawl-carrier is in normal position; a pinion, concentric with and fixed to said indexing disc; a slidable rack, meshing with said pinion; an indexing arm, fixed to said rack and having a pointer thereon; an indicating scale, with reference to which said pointer is movable; a second ratchet wheel mounted to rotate about an axis; driving connections between said second ratchet wheel and said units order type-wheel; an arm, mounted to rock about the axis of said last-mentioned ratchet wheel; a pawl, pivoted on said arm and cooperating with said second ratchet wheel; a push member carried by said arm and having a portion in the path of the pin on said indexing disc, whereby movement of said indexing disc in one direction from normal position causes said arm to rock about its pivot; and spring means for returning said arm and indexing disc to normal position.

21. In a machine of the class described including a power shaft, adapted to be given cycles of operation, and a consecutive number device having a units order type-wheel, means for automatically advancing said units order type-wheel comprising the combination of a rotatably mounted indexing disc, having a laterally-projecting pin thereon; a ratchet wheel, fixed to said disc and concentric therewith; a pawl-carrier, mounted to oscillate about the axis of said ratchet wheel; a pitman connected to said pawl-carrier; cam means on said power shaft for reciprocating said pitman; a pawl carried by said pawl-carrier and cooperating with said ratchet wheel, said pawl having a cam surface thereon; a fixed pin, cooperating with said cam surface to hold said pawl from engagement with the ratchet wheel when the pawl-carrier is in normal position; a pinion, concentric with and fixed to said indexing disc; a slidable rack, meshing with said pinion; an indexing arm, fixed to said rack and having a pointer thereon; an indicating scale, with reference to which said pointer is movable; a rotatable ratchet wheel; driving connections between said last-mentioned ratchet wheel and said units order type-wheel; a push member, supported in the path of the pin on said indexing disc; means, actuated by said push member, for advancing said ratchet wheel, whereby movement of said indexing disc in one direction from normal position advances said units order type-wheel; and spring means for returning said indexing disc to normal position.

22. In a machine of the class described including a power shaft, adapted to be given cycles of operation, and a consecutive number device having a units order type-wheel, means for automatically advancing said units order type-wheel comprising the combination of a rotatably mounted indexing disc; a ratchet wheel, fixed to said disc and concentric therewith; a pawl-carrier, mounted to oscillate about the axis of said ratchet wheel; a pitman connected to said pawl-carrier; cam means on said power shaft for reciprocating said pitman; a pawl carried by said pawl-carrier and cooperating with said ratchet wheel, said pawl having a cam surface thereon; a fixed pin, located to cooperate with said cam surface to hold said pawl out of engagement with the ratchet wheel when the pawl-carrier is in normal position; a pinion, concentric with and fixed to said indexing disc; a slidable rack, meshing with said pinion; an indexing arm, fixed to said rack and having a pointer thereon; an indicating scale, with reference to which said pointer is movable; means, actuated by movement of said indexing disc in one direction from normal position, for advancing said units order type-wheel; and spring means for returning said indexing disc to normal position.

23. In a machine of the class described including a power shaft, adapted to be given cycles of operation, and a consecutive number device having a units order type-wheel, means for automatically advancing said units order type-wheel comprising the combination of a rotatably mounted indexing disc; a ratchet wheel, fixed to said disc and concentric therewith; a pawl-carrier, mounted to oscillate about the axis of said ratchet wheel; cam means on said power shaft, connected to oscillate said pawl-carrier once in each cycle of operation; a pawl, carried by said pawl-carrier and cooperating with said ratchet wheel, said pawl having a cam surface thereon; a fixed pin, located to cooperate with said cam surface to hold said pawl from engagement with the ratchet wheel when the pawl-carrier is in normal position; a pinion, concentric with and fixed to said indexing disc; a slidable rack, meshing with said pinion; an indexing arm, fixed to said rack and having a pointer thereon; an indicating scale, with reference to which said pointer is movable; means, actuated by movement of said indexing disc in one direction from normal position, for advancing said units order type-wheel; and spring means for returning said indexing disc to normal position.

24. In a machine of the class described including a power shaft, adapted to be given cycles of operation, and a consecutive number device having a units order type-wheel, means for automatically advancing said units order type-wheel comprising the combination of a rotatably mounted indexing disc; a ratchet wheel, fixed to said disc and concentric therewith; a pawl-carrier, mounted to oscillate about the axis of said ratchet wheel; cam means on said power shaft, connected to oscillate said pawl-carrier once each cycle of operation; a pawl, carried by said pawl-carrier and cooperating to advance said ratchet wheel on movement of the pawl-carrier in one direction; means for disengaging said pawl from said ratchet wheel on movement of said pawl-carrier to normal position; a pinion, concentric with and fixed to said indexing disc; a slidable rack, meshing with said pinion; an indexing arm, fixed to said rack and having a pointer thereon; an indicating scale, with reference to which said pointer is movable; means, actuated by movement of said indexing disc in one direction from normal position, for advancing said units order type-wheel; and spring means for returning said indexing disc to normal position.

25. In a machine of the class described including a power shaft, adapted to be given cycles of operation, and a consecutive number device having a units order type-wheel, means for automatically advancing said units order type-wheel comprising the combination of a rotatably mounted indexing disc; a ratchet wheel, fixed to said disc and concentric therewith; a pawl-carrier, mounted to oscillate about the axis of said ratchet wheel; cam means on said power shaft, connected to oscillate said pawl-carrier once each cycle of operation; a pawl, carried by said pawl-carrier and cooperating to advance said ratchet wheel on movement of the pawl-carrier in one direction; a pinion, concentric with and fixed to said indexing disc; a slidable rack, meshing with said pinion; an indexing arm, fixed to said rack and having a pointer thereon; an indicating scale, with reference to which said pointer is movable; means, actuated by movement of said indexing disc in one direction from normal position, for advancing said units order type-wheel and spring means for returning said indexing disc to normal position.

26. In a machine of the class described including a power shaft, adapted to be given cycles of operation, and a consecutive number device having a units order type-wheel, means for automatically advancing said units order type-wheel comprising the combination of a rotatably mounted indexing disc; means, actuated by said power shaft, for advancing said indexing disc one step for each cycle of operation; a pinion, concentric with and fixed to said indexing disc; a slidable rack, meshing with said pinion; an indexing arm, fixed to said rack and having a pointer thereon; an indicating scale, with reference to which said pointer is movable; means, actuated by movement of said indexing disc in advancing direction from normal position, for advancing said units order type-wheel; and spring means for returning said indexing disc to normal position.

27. In a machine of the class described including a power shaft, adapted to be given cycles of operation, and a consecutive number device having a units order type-wheel, means for automatically advancing said units order type-wheel comprising the combination of a rotatably mounted indexing disc; means, operated by said power shaft, for advancing said indexing disc one step for each cycle of operation; a pinion, concentric with and fixed to said indexing disc; a slidable rack, meshing with said pinion; a setting arm fixed to said rack; means, actuated by the advance of said indexing disc from normal position, for advancing said units order type-wheel; and spring means for returning said indexing disc to normal position.

28. In a machine of the class described including a power shaft, adapted to be given cycles of operation, and a consecutive number device having a units order type-wheel, means for automatically advancing said units order type-wheel comprising the combination of a rotatably mounted indexing disc; means, operated by said power shaft, for automatically advancing said indexing disc one step for each cycle of operation; manually adjustable setting means for rotating said indexing disc, in a direction opposed to the advance thereof, to a position a predetermined number of steps in rear of its normal position; means, actuated by advance of said indexing disc from normal position, for advancing said units order type-wheel; and spring means for returning said indexing disc to normal position.

29. In a machine of the class described including a power shaft, adapted to be given cycles of operation, and a consecutive number device having a units order type-wheel, means for automatically advancing said units order type-wheel comprising the combination of an indexing member, having a normal position and movable in both directions therefrom; manually adjustable means for moving said member to a position a predetermined number of steps in rear of said normal position; means, operated by said power shaft, for advancing said member one stop for each cycle of operation; means, actuated by the advance of said indexing member from normal position, for advancing said units order type-wheel; and spring means for returning said indexing member to normal position.

30. In a machine of the class described including a power shaft, adapted to be given cycles of operation, a units order type-wheel, and impression mechanism for taking an imprint therefrom, the combination of an indexing member, having a normal position and movable in both directions therefrom; a manually adjustable device having a normal position; means, actuated by movement of said device from normal position, for moving said indexing member a predetermined number of steps to rear of normal position; means, operated by said power shaft, for advancing said indexing member one step at each cycle of operation; means, actuated by advance of said indexing member from normal position, for advancing said units order type-wheel; and means, actuated by movement of said device from normal position, for disabling said impression mechanism.

31. In a machine of the class described including a power shaft, adapted to be given cycles of operation, a plurality of type wheels and impression mechanism for taking an imprint therefrom, the combination of an indexing member, having a normal position and movable in both directions therefrom; a manually adjustable device having a normal position; means, actuated by movement of said device from normal position, for moving said indexing member a predetermined number of steps to rear of normal position; means, operated by said power shaft, for advancing said indexing member one step at each cycle of operation, and returning said device step-by-step to normal position; and means, actuated by movement of said device from normal position, for disabling said impression mechanism.

32. In a machine of the class described including a power shaft, adapted to be given cycles of operation, a plurality of type-carriers, means for adjusting said type-carriers to present selected type at a printing line and an impression mechanism for taking an imprint from the type at said printing line, the combination of a setting member, movable a predetermined number of steps from normal position; means, operated by said power shaft, for returning said setting member to normal position, one step for each cycle of operation; and means, actuated by said setting member, for disabling said impression mechanism when said setting member is out of normal position, said means being rendered ineffective by movement of the setting member to normal position.

33. In a machine of the class described, the combination of, a main operating means operable in one or more cycles to record a transaction; means to advance a record sheet step by step across a list printing station; means to supply record tag material to a tag printing station step by step; a set of type wheels to print data on a record sheet at the list printing station; a set of type wheels to print data on the tag material at the tag printing station; manually operable means to set up the same data on both settable type means by a selection means common to both settable type means; a set of number type wheels settable through a units order wheel for printing consecutive numbers on a record sheet at the list printing station; a set of number type wheels settable through a units order wheel for printing consecutive numbers on tag material at the tag printing station; means to sever a tag at the tag printing station; means operable after the selected number of machine cycles to advance the units number wheels of both sets a unit; platen means operable to take an imprint, at the list printing station on a record sheet, from the list printing type wheels of both the data set and the consecutive number set; platen means operable, after being moved by an operator to an operating position, to take an imprint on the tag material at the tag printing station from the tag printing type wheels of both the data set and the consecutive number set, said platen being adapted to receive a garment; means operable to fasten a severed tag to the garment held on the platen; and a program control means operated by the main operating means, in one cycle of operation to advance a record sheet across the list printing station and to supply record tag material to the tag printing station, to print data on a record sheet at the list printing station in the last of the selected number of cycles, to print data on tag material at the tag printing station, to operate the fastening means to fasten the printed tag material to the garment held on the platen and to sever the printed portion of the tag material fastened to the garment, to operate the units number wheel advancing means in the last selected cycle, said program control means being operated by the main operating means under control of a manually operable selector to control the number of machine cycles.

THOMAS A. CAROTHERS.
CLARENCE B. DES JARDINS.
EDWARD J. UTZ.

REFERENCES CITED

The following references are of record in the file of this patent:

UNITED STATES PATENTS

| Number | Name | Date |
| --- | --- | --- |
| 583,878 | Hocke | June 1, 1897 |
| 1,210,071 | Hoffman | Dec. 26, 1916 |
| 1,222,359 | Chapman | Apr. 10, 1917 |
| 1,229,844 | White | June 12, 1917 |
| 1,403,321 | Henry | Jan. 10, 1922 |
| 1,409,015 | Newton | Mar. 7, 1922 |
| 1,515,857 | Hoffman | Nov. 18, 1924 |
| 1,526,287 | Horner | Feb. 10, 1925 |
| 1,770,487 | Johnson | July 15, 1930 |
| 2,080,649 | Breitling | May 18, 1937 |
| 2,125,626 | Flood | Aug. 2, 1938 |
| 2,160,552 | Maiben | May 30, 1939 |
| 2,187,200 | Green | Jan. 16, 1940 |
| 2,205,724 | Hines | June 25, 1940 |
| 2,331,251 | Vantuyl | Oct. 5, 1943 |
| 2,353,636 | Bailey | July 18, 1944 |
| 2,362,261 | Francis | Nov. 7, 1944 |